(12) United States Patent
Sager et al.

(10) Patent No.: US 11,182,730 B2
(45) Date of Patent: Nov. 23, 2021

(54) DETERMINING A DELIVERY LOCATION AND TIME BASED ON THE SCHEDULE OR LOCATION OF A CONSIGNEE

(71) Applicant: United Parcel Service of America, Inc., Atlanta, GA (US)

(72) Inventors: Jeffrey C. Sager, Dallastown, PA (US); William Gensburg, Larchmont, NY (US)

(73) Assignee: United Parcel Service of America, Inc., Atlanta, GA (US)

( * ) Notice: Subject to any disclaimer, the term of this patent is extended or adjusted under 35 U.S.C. 154(b) by 643 days.

(21) Appl. No.: 14/623,145

(22) Filed: Feb. 16, 2015

(65) Prior Publication Data

US 2016/0180288 A1   Jun. 23, 2016

Related U.S. Application Data

(60) Provisional application No. 61/940,441, filed on Feb. 16, 2014.

(51) Int. Cl.
| | |
|---|---|
| *G06Q 10/08* | (2012.01) |
| *G06Q 50/28* | (2012.01) |
| *H04L 12/58* | (2006.01) |

(52) U.S. Cl.
CPC ....... *G06Q 10/0833* (2013.01); *G06Q 10/083* (2013.01); *G06Q 10/0836* (2013.01); *G06Q 50/28* (2013.01); *H04L 51/04* (2013.01)

(58) Field of Classification Search
CPC .. G06Q 10/083; G06Q 10/0836; G06Q 50/28; H04L 51/04

(Continued)

(56) References Cited

U.S. PATENT DOCUMENTS

| | | |
|---|---|---|
| 3,721,096 A | 3/1973 | Deckert, Jr. et al. |
| 3,876,059 A | 4/1975 | Durst |

(Continued)

FOREIGN PATENT DOCUMENTS

| | | |
|---|---|---|
| CN | 1643534 A | 7/2005 |
| CN | 101203873 A | 6/2008 |

(Continued)

OTHER PUBLICATIONS

Haughton, Michael. "Route reoptimization's impact on delivery efficiency". https://www.sciencedirect.com/science/article/pii/S1366554501000114 (Year: 2001).*

(Continued)

*Primary Examiner* — George Chen
*Assistant Examiner* — Lisa Ma
(74) *Attorney, Agent, or Firm* — Shook, Hardy & Bacon LLP

(57) ABSTRACT

Systems, methods, apparatus, and computer program products are provided for programmatically determining/identifying a delivery location and time based on the schedule of the consignee. One example embodiment may include a method comprising receiving shipping/parcel information/data, the shipping/parcel information/data indicative of an item/parcel to be delivered to a consignee by a carrier, determining whether consignee schedule information/data is accessible, the consignee schedule information/data comprising information/data indicative of a consignee and information/data indicative of a location and an associated time at which the consignee has indicated an ability to receive an item, and providing, to a client device, via a network, a delivery location and a delivery time, the delivery location and the delivery time determined between the consignee schedule information/data and the default delivery location and the estimated time of delivery.

16 Claims, 14 Drawing Sheets

(58) Field of Classification Search
USPC .......................................................... 705/333
See application file for complete search history.

(56) References Cited

U.S. PATENT DOCUMENTS

| | | | |
|---|---|---|---|
| 3,933,031 A | 1/1976 | Uhlarik |
| 4,111,601 A | 9/1978 | Richard |
| 4,832,204 A | 5/1989 | Handy et al. |
| 5,153,842 A | 10/1992 | Dlugos, Sr. et al. |
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,460,110 A | 10/1995 | Eronen et al. |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,659,731 A | 8/1997 | Gustafson |
| 5,668,543 A | 9/1997 | Jones |
| 5,711,670 A | 1/1998 | Barr |
| 5,786,748 A | 7/1998 | Nikolic et al. |
| 5,831,860 A | 11/1998 | Foladare et al. |
| 5,835,377 A | 11/1998 | Bush |
| 5,884,272 A | 3/1999 | Walker et al. |
| 6,029,140 A | 2/2000 | Martin et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,292,709 B1 | 9/2001 | Uhl et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,422,506 B1 | 7/2002 | Colby |
| 6,442,589 B1 | 8/2002 | Takahashi et al. |
| 6,463,354 B1 | 10/2002 | Pintsov |
| 6,463,420 B1 | 10/2002 | Guidice et al. |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,606,604 B1 | 8/2003 | Dutta |
| 6,618,668 B1 | 9/2003 | Laird |
| 6,634,551 B2 | 10/2003 | Barta et al. |
| 6,683,542 B1 | 1/2004 | Jones |
| 6,700,507 B2 | 3/2004 | Jones |
| 6,701,299 B2 | 3/2004 | Kraisser et al. |
| 6,714,859 B2 | 3/2004 | Jones |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,765,487 B1 | 7/2004 | Holmes et al. |
| 6,772,130 B1 | 8/2004 | Karbowski et al. |
| 6,804,606 B2 | 10/2004 | Jones |
| 6,845,448 B1 | 1/2005 | Chaganti et al. |
| 6,859,722 B2 | 2/2005 | Jones |
| 6,862,612 B1 | 3/2005 | Horn et al. |
| 6,902,109 B2 | 6/2005 | Barta et al. |
| 6,904,359 B2 | 6/2005 | Jones |
| 6,931,314 B2 | 8/2005 | Holland et al. |
| 6,952,645 B1 | 10/2005 | Jones |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,994,253 B2 | 2/2006 | Miller et al. |
| 7,028,895 B2 | 4/2006 | Ashaari |
| 7,030,781 B2 | 4/2006 | Jones |
| 7,031,959 B2 | 4/2006 | Gamer et al. |
| 7,039,813 B2 | 5/2006 | Algazi et al. |
| 7,130,803 B1 | 10/2006 | Couch et al. |
| 7,152,375 B1 | 12/2006 | Mastro et al. |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,257,552 B1 | 8/2007 | Franco |
| 7,305,404 B2 | 12/2007 | Owens et al. |
| 7,312,702 B1 | 12/2007 | Willms et al. |
| 7,331,248 B2 | 2/2008 | Maresca, Jr. et al. |
| 7,363,126 B1 | 4/2008 | Zhong et al. |
| 7,376,598 B2 | 5/2008 | Estes et al. |
| 7,385,499 B2 | 6/2008 | Horton et al. |
| 7,422,149 B2 | 9/2008 | Aptekar |
| 7,479,899 B2 | 1/2009 | Horstemeyer |
| 7,501,946 B2 | 3/2009 | Lanigan et al. |
| 7,511,617 B2 | 3/2009 | Burman |
| 7,528,722 B2 | 5/2009 | Nelson |
| 7,531,163 B2 | 5/2009 | Samadpour |
| 7,542,972 B2 | 6/2009 | Owens et al. |
| 7,574,366 B2 | 8/2009 | Burman |
| 7,580,845 B2 | 8/2009 | Burman |
| 7,624,024 B2 | 11/2009 | Levis et al. |
| 7,647,231 B2 | 1/2010 | Kuebert et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins |
| 7,912,854 B2 | 3/2011 | Owens et al. |
| 7,925,524 B2 | 4/2011 | Florence |
| 7,962,422 B1 | 6/2011 | Melechko et al. |
| 7,969,306 B2 | 6/2011 | Ebert et al. |
| 7,984,289 B2 | 7/2011 | Orbke et al. |
| 7,996,328 B1 | 8/2011 | Lundberg et al. |
| 8,015,023 B1 * | 9/2011 | Lee ................ G06Q 10/063114 705/1.1 |
| 8,027,933 B2 | 9/2011 | Lou et al. |
| 8,036,993 B2 | 10/2011 | Estes |
| 8,068,930 B2 | 11/2011 | Perez et al. |
| 8,103,521 B2 | 1/2012 | Kuebert et al. |
| 8,103,716 B2 | 1/2012 | Boyce et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,244,566 B1 | 8/2012 | Coley et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,291,234 B2 | 10/2012 | Snapp et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |

(56) References Cited

U.S. PATENT DOCUMENTS

| | | |
|---|---|---|
| 8,380,641 B1 | 2/2013 | Bennett et al. |
| 8,386,516 B2 | 2/2013 | Owens et al. |
| 8,429,019 B1* | 4/2013 | Yeatts ................. G06Q 10/083 |
| | | 705/26.1 |
| 8,463,568 B1 | 6/2013 | Wynn |
| 8,489,520 B2 | 7/2013 | Kuebert et al. |
| 8,554,694 B1 | 10/2013 | Ward et al. |
| 8,577,802 B1 | 11/2013 | Nichols et al. |
| 8,645,232 B1 | 2/2014 | Cole et al. |
| 8,731,699 B2 | 5/2014 | Nagy et al. |
| 8,736,633 B2 | 5/2014 | Gurusamy |
| 8,812,374 B1 | 8/2014 | Sriram et al. |
| 9,032,032 B2 | 5/2015 | Mills et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0032573 A1 | 3/2002 | Williams et al. |
| 2002/0032612 A1 | 3/2002 | Williams et al. |
| 2002/0032623 A1 | 3/2002 | Wheeler et al. |
| 2002/0042808 A1 | 4/2002 | Smith et al. |
| 2002/0070882 A1 | 6/2002 | Jones |
| 2002/0073039 A1 | 6/2002 | Ogg et al. |
| 2002/0082770 A1 | 6/2002 | Jones |
| 2002/0087371 A1 | 7/2002 | Abendroth |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178074 A1 | 11/2002 | Bloom |
| 2003/0003936 A1 | 1/2003 | Tighe |
| 2003/0004893 A1 | 1/2003 | Blaesche |
| 2003/0032573 A1 | 2/2003 | Tanner et al. |
| 2003/0036938 A1 | 2/2003 | Dutta et al. |
| 2003/0037009 A1 | 2/2003 | Tobin et al. |
| 2003/0074411 A1 | 4/2003 | Nale |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0182017 A1 | 9/2003 | O'Donohue et al. |
| 2003/0193414 A1 | 10/2003 | Jones |
| 2003/0195811 A1 | 10/2003 | Hayes et al. |
| 2004/0030478 A1 | 2/2004 | Holland et al. |
| 2004/0030604 A1* | 2/2004 | Young ............. G06Q 10/06312 |
| | | 705/307 |
| 2004/0073499 A1 | 4/2004 | Martin et al. |
| 2004/0088224 A1 | 5/2004 | Mukai |
| 2004/0093312 A1 | 5/2004 | Cordery et al. |
| 2004/0117326 A1 | 6/2004 | Amato |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0193438 A1 | 9/2004 | Stashluk et al. |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0227630 A1 | 11/2004 | Shannon et al. |
| 2004/0241644 A1 | 12/2004 | Samadpour |
| 2004/0243430 A1 | 12/2004 | Horstemeyer |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0038758 A1 | 2/2005 | Hilbush et al. |
| 2005/0043845 A1 | 2/2005 | Wiechers |
| 2005/0071258 A1 | 3/2005 | Kumakawa |
| 2005/0080638 A1 | 4/2005 | Maseruka |
| 2005/0082752 A1 | 4/2005 | Acosta |
| 2005/0104716 A1 | 5/2005 | Simms et al. |
| 2005/0114221 A1 | 5/2005 | Walters et al. |
| 2005/0177387 A1 | 8/2005 | Mojsa |
| 2005/0216144 A1 | 9/2005 | Baldassa |
| 2005/0216294 A1 | 9/2005 | Labow |
| 2005/0216553 A1 | 9/2005 | Mallonee et al. |
| 2005/0251402 A1 | 11/2005 | Olsen et al. |
| 2005/0252596 A1 | 11/2005 | Olsen et al. |
| 2006/0010037 A1 | 1/2006 | Angert et al. |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0074729 A1 | 4/2006 | Capotosto et al. |
| 2006/0085273 A1 | 4/2006 | Mayer et al. |
| 2006/0097896 A1 | 5/2006 | Jones |
| 2006/0100970 A1 | 5/2006 | Morony et al. |
| 2006/0149577 A1 | 7/2006 | Stashluk et al. |
| 2006/0022895 A1 | 10/2006 | Kodger, Jr. |
| 2006/0229895 A1 | 10/2006 | Kodger, Jr. |
| 2006/0248941 A1 | 11/2006 | Maresca et al. |
| 2006/0255136 A1 | 11/2006 | Wagner et al. |
| 2006/0282277 A1 | 12/2006 | Ng |
| 2007/0000989 A1 | 1/2007 | Kadaba |
| 2007/0005452 A1 | 1/2007 | Klingenberg et al. |
| 2007/0078797 A1 | 4/2007 | Won et al. |
| 2007/0083410 A1* | 4/2007 | Hanna ................ G06Q 10/0835 |
| | | 705/333 |
| 2007/0133876 A1 | 6/2007 | Chande et al. |
| 2007/0150533 A1 | 6/2007 | Krause et al. |
| 2007/0156415 A1 | 7/2007 | Foth et al. |
| 2007/0156439 A1 | 7/2007 | Fyda et al. |
| 2007/0192191 A1 | 8/2007 | Neal et al. |
| 2007/0200671 A1 | 8/2007 | Kelley et al. |
| 2007/0202802 A1 | 8/2007 | Kallio et al. |
| 2007/0257774 A1 | 11/2007 | Stumpert et al. |
| 2008/0004995 A1 | 1/2008 | Klingenberg et al. |
| 2008/0125959 A1 | 5/2008 | Doherty et al. |
| 2008/0133261 A1 | 6/2008 | Ray |
| 2008/0154781 A1 | 6/2008 | Kumar |
| 2008/0162241 A1 | 7/2008 | Betancourt |
| 2008/0172305 A1 | 7/2008 | Estes et al. |
| 2008/0201155 A1 | 8/2008 | Som |
| 2008/0208772 A1 | 8/2008 | Rundle |
| 2008/0210749 A1 | 9/2008 | Skaaksrud et al. |
| 2008/0221913 A1 | 9/2008 | Cook et al. |
| 2008/0223940 A1 | 9/2008 | Lee et al. |
| 2008/0281719 A1 | 11/2008 | Hall et al. |
| 2008/0312991 A1 | 12/2008 | Bharadwaj et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0164390 A1 | 6/2009 | Caiman et al. |
| 2009/0173672 A1 | 7/2009 | Avant et al. |
| 2009/0187489 A1 | 7/2009 | Mallick et al. |
| 2009/0269760 A1 | 10/2009 | Samadpour |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1* | 12/2009 | Piccinini ................ G06Q 10/08 |
| | | 705/1.1 |
| 2009/0327361 A1 | 12/2009 | Mills et al. |
| 2010/0004960 A1 | 1/2010 | Frankenberg et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100229 A1 | 4/2010 | Whitson et al. |
| 2010/0100497 A1 | 4/2010 | Kuebert et al. |
| 2010/0121689 A1 | 5/2010 | Wallace et al. |
| 2010/0185565 A1 | 7/2010 | Wade |
| 2010/0211426 A1 | 8/2010 | Mcclurg |
| 2010/0211444 A1 | 8/2010 | Spear |
| 2010/0235210 A1 | 9/2010 | Nadrotowicz, Jr. |

(56) References Cited

U.S. PATENT DOCUMENTS

| | | | |
|---|---|---|---|
| 2010/0299278 A1 | 11/2010 | Kriss et al. | |
| 2011/0004562 A1 | 1/2011 | Hennessy et al. | |
| 2011/0022532 A1 | 1/2011 | Kriss | |
| 2011/0060552 A1 | 3/2011 | Ono | |
| 2011/0125665 A1 | 5/2011 | Kadaba | |
| 2011/0238195 A1 | 9/2011 | Nagy et al. | |
| 2011/0270714 A1 | 11/2011 | Myrick et al. | |
| 2011/0320308 A1 | 12/2011 | Herrington | |
| 2012/0016948 A1 | 1/2012 | Sinha | |
| 2012/0030133 A1* | 2/2012 | Rademaker | G06Q 10/08 705/333 |
| 2012/0047085 A1 | 2/2012 | Naghshineh et al. | |
| 2012/0089532 A1 | 4/2012 | Kuebert et al. | |
| 2012/0095934 A1 | 4/2012 | Klingenberg et al. | |
| 2012/0130625 A1 | 5/2012 | Srivastava | |
| 2012/0130916 A1 | 5/2012 | Neal et al. | |
| 2012/0173308 A1 | 7/2012 | Brown et al. | |
| 2012/0173448 A1 | 7/2012 | Rademaker | |
| 2012/0179622 A1 | 7/2012 | Amato | |
| 2012/0208559 A1 | 8/2012 | Svendsen et al. | |
| 2012/0235791 A1 | 9/2012 | Donlan et al. | |
| 2012/0246077 A1* | 9/2012 | Skaaksrud | G06Q 30/0615 705/50 |
| 2012/0289244 A1* | 11/2012 | Goyal | G01S 19/34 455/456.1 |
| 2012/0303538 A1 | 11/2012 | Marcus et al. | |
| 2012/0303539 A1 | 11/2012 | Marcus et al. | |
| 2012/0303540 A1 | 11/2012 | Marcus et al. | |
| 2012/0303541 A1* | 11/2012 | Marcus | G06Q 10/00 705/330 |
| 2012/0303542 A1 | 11/2012 | Marcus et al. | |
| 2012/0310853 A1 | 12/2012 | Aldstadt | |
| 2013/0006731 A1 | 1/2013 | Cook et al. | |
| 2013/0006777 A1 | 1/2013 | Krishnareddy et al. | |
| 2013/0006885 A1 | 1/2013 | Kuebert et al. | |
| 2013/0013101 A1 | 1/2013 | Bonnell et al. | |
| 2013/0013102 A1 | 1/2013 | Bonnell et al. | |
| 2013/0013350 A1 | 1/2013 | McCullough et al. | |
| 2013/0016636 A1 | 1/2013 | Berger et al. | |
| 2013/0024525 A1 | 1/2013 | Brady et al. | |
| 2013/0054054 A1 | 2/2013 | Tollenaere et al. | |
| 2013/0066744 A1* | 3/2013 | Higgins | G06Q 30/06 705/26.41 |
| 2013/0073336 A1 | 3/2013 | Heath | |
| 2013/0113819 A1 | 5/2013 | Gurusamy | |
| 2013/0144428 A1 | 6/2013 | Irwin et al. | |
| 2013/0212037 A1 | 8/2013 | Briggman et al. | |
| 2013/0238599 A1 | 9/2013 | Burris | |
| 2013/0238658 A1 | 9/2013 | Burris | |
| 2013/0246396 A1 | 9/2013 | Clare et al. | |
| 2013/0262336 A1 | 10/2013 | Wan et al. | |
| 2013/0275328 A1 | 10/2013 | Klingenberg et al. | |
| 2013/0291079 A1 | 10/2013 | Lowe et al. | |
| 2014/0046585 A1* | 2/2014 | Morris, IV | G01C 21/3415 701/468 |
| 2014/0052661 A1 | 2/2014 | Shakes et al. | |
| 2014/0180959 A1* | 6/2014 | Gillen | G06Q 10/0833 705/341 |
| 2014/0211984 A1* | 7/2014 | Calio | G06Q 10/087 382/103 |
| 2014/0222711 A1 | 8/2014 | Tibbs et al. | |
| 2014/0266668 A1 | 9/2014 | Blankenship et al. | |
| 2015/0081587 A1 | 3/2015 | Gillen | |
| 2015/0134560 A1 | 5/2015 | Krishnaiahsetty | |
| 2015/0154559 A1 | 6/2015 | Barbush et al. | |
| 2015/0193724 A1* | 7/2015 | Stevens | G06Q 10/083 705/330 |

FOREIGN PATENT DOCUMENTS

| | | |
|---|---|---|
| CN | 102567883 A1 | 7/2012 |
| DE | 19644163 A1 | 5/1998 |
| DE | 10007897 C1 | 6/2001 |
| GB | 2483220 A | 3/2012 |
| JP | 10-207956 | 7/1998 |
| JP | 11-139540 | 5/1999 |
| JP | 2000-339373 | 8/2000 |
| JP | 2001-014393 | 1/2001 |
| JP | 2001-022678 | 1/2001 |
| JP | 2002-042008 | 2/2002 |
| JP | 2002-056307 | 2/2002 |
| JP | 2005-213020 A | 8/2005 |
| JP | 2006-206225 A | 8/2006 |
| TW | 201220221 A | 5/2012 |
| WO | WO 2000/019170 A1 | 4/2000 |
| WO | WO 2000/019171 A1 | 4/2000 |
| WO | WO 2000/030014 | 5/2000 |
| WO | WO 2000/046726 | 8/2000 |
| WO | WO 2000/046728 | 8/2000 |
| WO | WO 2000/052422 A1 | 9/2000 |
| WO | WO 2001/016889 | 3/2001 |
| WO | WO 2001/029778 | 4/2001 |
| WO | WO 2001/035344 | 5/2001 |
| WO | WO 2001/039031 A2 | 5/2001 |
| WO | WO 2001/065451 A1 | 9/2001 |
| WO | WO 2001/065454 | 9/2001 |
| WO | WO 2001/065523 A1 | 9/2001 |
| WO | WO 2001/065524 A1 | 9/2001 |
| WO | WO 2001/067344 | 9/2001 |
| WO | WO 2001/072109 | 10/2001 |
| WO | WO 2001/084359 A2 | 11/2001 |
| WO | WO 2001/088831 | 11/2001 |
| WO | WO 2001/097101 A2 | 12/2001 |
| WO | WO 2002/007104 | 1/2002 |
| WO | WO 2002/017045 | 2/2002 |
| WO | WO 2002/052378 | 7/2002 |
| WO | WO 2003/034293 A1 | 4/2003 |
| WO | WO 2004/015518 | 2/2004 |
| WO | WO 2005/105329 A1 | 11/2005 |
| WO | WO-2007002211 A2 * | 1/2007 ........... G06Q 20/203 |
| WO | WO 2011/017286 A2 | 2/2011 |
| WO | WO 2011/0150971 A1 | 12/2011 |
| WO | WO 2012/045182 A1 | 4/2012 |
| WO | WO 2012/129529 A1 | 9/2012 |
| WO | WO 2012/135143 A2 | 10/2012 |
| WO | WO 2012/161728 A1 | 11/2012 |
| WO | WO 2012/161730 A2 | 11/2012 |
| WO | WO 2012/161731 A2 | 11/2012 |
| WO | WO 2012/161732 A2 | 11/2012 |

OTHER PUBLICATIONS

Canadian Intellectual Property Office, Requisition by the Examiner for Application No. 2,842,840, Nov. 4, 2015, 5 pages, Canada.
United States Patent and Trademark Office, Office Action for U.S. Appl. No. 13/913,171, dated Dec. 15, 2015, 26 pages, U.S.
United States Patent and Trademark Office, Office Action for U.S. Appl. No. 13/465,555, dated Nov. 19, 2015, 22 pages, U.S.
United States Patent and Trademark Office, Office Action for U.S. Appl. No. 13/326,887, dated Dec. 17, 2015, 28 pages, U.S.
United States Patent and Trademark Office, Office Action for U.S. Appl. No. 13/326,750, dated Dec. 23, 2015, 26 pages, U.S.
United States Patent and Trademark Office, Office Action for U.S. Appl. No. 13/326,851, dated Dec. 24, 2015, 29 pages, U.S.
United States Patent and Trademark Office, Office Action for U.S. Appl. No. 13/746,842, dated Jan. 22, 2016, 22 pages, U.S.
United States Patent and Trademark Office, Office Action for U.S. Appl. No. 13/839,398, dated Jan. 20, 2016, 48 pages, U.S.
International Search Report and Written Opinion from International Application No. PCT/US2015/016025 dated Apr. 29, 2015.
Canadian Intellectual Property Office, Requisition by the Examiner for Application No. 2,609,841, dated Nov. 14, 2016, 8 pages, U.S.A.
United States Patent and Trademark Office, Office Action For U.S. Appl. No. 13/913,191, dated Jan. 12, 2017, 24 pages, U.S.A.
United States Patent and Trademark Office, Office Action for U.S. Appl. No. 13/913,171, dated Jan. 27, 2017, 25 pages, U.S.A.
United States Patent and Trademark Office, Office Action for U.S. Appl. No. 13/913,066, dated Dec. 22, 2016, 19 pages, U.S.A.
United States Patent and Trademark Office, Office Action for U.S. Appl. No. 10/696,180, dated Dec. 22, 2016, 31 pages, U.S.A.

(56) References Cited

OTHER PUBLICATIONS

United States Patent and Trademark Office, Office Action for U.S. Appl. No. 13/746,842, dated Jan. 11, 2017, 38 pages, U.S.A.
United States Patent and Trademark Office, Office Action for U.S. Appl. No. 13/569,316, dated Dec. 22, 2016, 36 pages, U.S.A.
United States Patent and Trademark Office, Office Action for U.S. Appl. No. 13/174, 306, dated Dec. 23, 2016, 34 pages, U.S.A.
United States Patent and Trademark Office, Office Action for U.S. Appl. No. 13/174,248, dated Dec. 23, 2016, 37 pages, U.S.A.
United States Patent and Trademark Office, Office Action for U.S. Appl. No. 13/174,269, dated Jan. 10, 2017, 35 pages, U.S.A.
United States Patent and Trademark Office, Office Action for U.S. Appl. No. 13/174,299, dated Dec. 23, 2016, 36 pages, U.S.A.
United States Patent and Trademark Office, Office Action for U.S. Appl. No. 13/174,290, dated Dec. 28, 2016, 36 pages, U.S.A.
United States Patent and Trademark Office, Office Action for U.S. Appl. No. 13/913,198, dated Feb. 3, 2017, 28 pages, U.S.A.
United States Patent and Trademark Office, Office Action for U.S. Appl. No. 14/049,605, dated Dec. 12, 2016, 18 pages, U.S.A.
United States Patent and Trademark Office, Office Action for U.S. Appl. No. 14/025,893, dated Sep. 22, 2016, 52 pages, U.S.A.
United States Patent and Trademark Office, Office Action for U.S. Appl. No. 14/049,828, dated Oct. 3, 2016, 64 pages, U.S.A.
United States Patent and Trademark Office, Office Action for U.S. Appl. No. 13/839,398, dated Oct. 6, 2016, 25 pages, U.S.A.
United States Patent and Trademark Office, Office Action for U.S. Appl. No. 14/049,605, dated Aug. 25, 2016, 59 pages, U.S.A.
United States Patent and Trademark Office, Office Action for U.S. Appl. No. 13/465,555, dated Nov. 10, 2016, 19 pages, U.S.A.
"Fedex Improves Internal, External Operations," *Frontline Solutions*, Apr. 5, 2001, pp. 1-2, www.frintlinemagazine.com/art_th/04052001.htx.
"Fedex Insight Empowers Customers with Enhanced Shipment Visibility and Control," *El Portal Del Transoorte*, Apr. 11, 2001, pp. 9-10.
"Many Happy Returns—UPS Unveils Advanced Outline Return Solution," *Business Wire*, Sep. 20, 2000.
"RPS Adds Automated Package Pick-up to Dedesigned Web Site," www.fedex.com/us/about/ground/pressreleases/pressrelease111198.html?link=4, retrieved Sep. 10, 2003.
"Schedule Distribution Routes and Timeslots," IP Ventures; www.ipventure.com/onlineorder/distribution.php, retrieved on Apr. 16, 2008.
"Scheduling Software Helps Webvan Meet 30-Minute Delivery Window," www.stores.org, Jul. 2000.
Author Unknown, "Outlook 2000 Handbook First Edition", p. 95 (relevant part), last 9 lines; one page.
Author Unknown, ASP V16-System Walker List Works Manual (relevant part); p. 88, line 5, 3.4 Start up and termination of ListWORKS writer; one page.
Brewin, et al., "Follow that Package!" *Computer World*, Mar. 19, 2001, www.computerworld.com/printthis/2001//0,4814,58696,00.html.
Caminti, et al. "United Parcel Service Introduces Advanced Label Imaging System," *Business Wire*, Nov. 29, 1989, p. 1.
Canadian Intellectual Property Office, Requisition by Examiner for Application No. 2,609,841, dated Dec. 2, 2011, 4 pages, Canada.
Canadian Intellectual Property Office, Requisition by Examiner for Application No. 2,504,285, dated Oct. 10, 2013, 2 pages, Canada.
Canadian Intellectual Property Office, Requisition by the Examiner for Application No. 2,609,841, dated Oct. 6, 2014, 3 pages, Canada.
Canadian Intellectual Property Office, Requisition by the Examiner for Application No. 2,609,841, dated Aug. 26, 2015, 5 pages, Canada.
Canadian Office Action dated Feb. 15, 2012, for Canadian Application No. 2,504,285.
De Marco, "E-tail Presents Can be Tougher to Send Back than Order," *Knight-Ridder/Tribune Business News*, Dec. 28, 1999, The Dialog Corporation, US.
Declaration of David Ellison pertaining to UPS and Mailbox etc. pre-filing activities from Mar. 2001-Nov. 1, 2002.
European Patent Office, Communication Pursuant to Article 94(3) EPC for Application No. 06773704.9, dated Feb. 5, 2014, 6 pages, The Netherlands.
European Patent Office, Result of Consultation for Application No. 03778034.3, dated Dec. 2, 2013, 5 pages, The Netherlands.
Fedex, "FedEx Mobile Ship", retrieved from <http://www.fedex.com/us/mobile/label.html, redirected to http://mobilesolutions.fedex.com/shipping-label.html > on Sep. 25, 2013, 2 pages.
Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.
Harrington, "The US Postal Service Gets Serious about Serving Business in the New Economy," *Journal*, May 2000, p. 2, vol. 41, No. 5, Penton Publishing, Inc., USA.
Henderson, "Buy.com Boosts Returns Process Efficiency with New Solution," *ProOuest Info and Learning*, Nov. 2000 pp. 72-76, vol. 82, No. 11.
International Preliminary Examining Authority, International Preliminary Report on Patentability for International Application No. PCT/US2013/068219, dated Dec. 12, 2014, 8 pages, United States Patent and Trademark Office, USA.
International Preliminary Examining Authority, International Preliminary Report on Patentability for International Application No. PCT/US2013/068210, dated Jan. 2, 2015, 9 pages, U.S. Patent and Trademark Office, USA.
International Search Report, dated Jul. 5, 2005 for International Application No. PCT/US 2003/34746 filed Oct. 31, 2003.
International Searching Authority, International Search Report and Written Opinion for International Application No. PCT/US11/59506, dated Aug. 3, 2012, 9 pages, United States Patent and Trademark Office, USA.
International Searching Authority, International Search Report and Written Opinion for International Application No. PCT/US06/24169, dated May 10, 2007, 7 pages, United States Patent and Trademark Office, USA.
International Searching Authority, International Search Report and Written Opinion for International Application No. PCT/US11/59513, dated Apr. 27, 2012.
International Searching Authority, International Search Report and Written Opinion for International Application No. PCT/US11/59511, dated May 2, 2012.
International Searching Authority, International Search Report and Written Opinion, dated Apr. 24, 2012, for International Application No. PCT/US11/59504.
International Searching Authority, International Search Report and Written Opinion for International Application No. PCT/US2013/68219, dated Feb. 21, 2014, 13 pages, USA.
International Searching Authority, International Search Report and Written Opinion for International Application for PCT/US2013/68210, dated May 20, 2014, 9 pages, United States Patent and Trademark Office, USA.
International Searching Authority, International Search Report and Written Opinion for International Application No. PCT/US2011/059508, dated Feb. 4, 2015, 9 pages, U.S. Patent and Trademark Office, USA.
International Searching Authority, International Search Report and Written Opinion for International Application No. PCT/US2013/75572, dated Feb. 20, 2015, 14 pages, United States Patent and Trademark Office, USA.
International Searching Authority, International Search Report and Written Opinion for International Application No. PCT/US2014/042959, dated Aug. 4, 2015, 8 pages, United States Patent and Trademark Office, U.S.A.
Iniernational Searching Authority, International Search Report and Written Opinion for International Application No. PCT/US2015/019475, dated Aug. 31, 2015, 15 pages, European Patent Office, The Netherlands.

(56) References Cited

OTHER PUBLICATIONS

Internet Archive WayBackMachine: www.usps.com, specifically, QuantumViewTM, https://web.archive.org/web/20021002110106/http://www.ups.com/iovs/ivs_learnmore.html, QuantumView Inbound, Quantum View Outbound, How QuantumView Outbound Works, Quantum View Service Options, QuantumView and UPS Aduinistration, 15 pages, retrieved Sep. 27-28, 2015.
Kihon, Kara Jissen, "Made Business Seikou No Tameno Kanpeki Guide—How to E-Commerce", p. 60, relevant part, one page.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Notice of Allowance dated Mar. 25, 2010 for U.S. Appl. No. 11/460,268.
Notice of Allowance dated Nov. 10, 2011 for U.S. Appl. No. 12/616,183.
Notice of Allowance dated Nov. 2, 2009 for U.S. Appl. No. 11/425,333.
Office Action dated Aug. 6, 2009 for U.S. Appl. No. 11/460,268.
Office Action dated Jan. 23, 2009 for U.S. Appl. No. 11/460,268.
Office Action dated Jan. 31, 2012, for U.S. Appl. No. 10/696,180, filed Oct. 28, 2003.
Office Action dated Jun. 11, 2009 for U.S. Appl. No. 11/425,333.
Office Action dated Oct. 15, 2008 for U.S. Appl. No. 11/425,333.
Office Action dated Sep. 23, 2011 for U.S. Appl. No. 12/616,183.
Office Action from U.S. Appl. No. 10/696,180 dated Aug. 19, 2009.
Office Action from U.S. Appl. No. 10/696,180 dated Dec. 9, 2009.
Office Action from U.S. Appl. No. 10/696,180 dated Feb. 3, 2009.
Office Action from U.S. Appl. No. 10/696,180 dated Feb. 15, 2011.
Office Action from U.S. Appl. No. 10/696,180 dated Jul. 7, 2011.
Office Action from U.S. Appl. No. 10/696,180 dated May 10, 2010.
Office Action from U.S. Appl. No. 10/696,180 dated Oct. 18, 2010.
Pender, "Hard Times are the Best Times, "*Cio*, Aug. 15, 2001, p. 3, www.cio.com/archive/081501/besttimes_content.html.
Raco Industries, "Increase Delivery Visibility and Simplify Your Process," retrieved from <http://www.racointeractive.com/media/834/raco_interactive-pd.pdf>, on Sep. 25, 2013, 2 pages.
U.S. Patent and Trademark Office, Office Action for U.S. Appl. No. 13/913,185, dated Jan. 30, 2015, 20 pages, USA.
U.S. Patent and Trademark Office, Office Action for U.S. Appl. No. 13/746,842, dated Feb. 27, 2015, 19 pages, USA.
U.S. Patent and Trademark Office, Office Action for U.S. Appl. No. 13/746,854, dated Feb. 27, 2015, 17 pages, USA.
U.S. Patent and Trademark Office, Office Action for U.S. Appl. No. 13/746,862, dated Mar. 2, 2015, 19 pages, USA.
U.S. Patent and Trademark Office, Office Action for U.S. Appl. No. 13/174,299, dated Mar. 2, 2015, 16 pages, USA.
U.S. Patent and Trademark Office, Office Action for U.S. Appl. No. 13/174,269, dated Mar. 2, 2015, 16 pages, USA.
U.S. Patent and Trademark Office, Office Action for U.S. Appl. No. 13/174,290, dated Mar. 2, 2015, 15 pages, USA.
U.S. Patent and Trademark Office, Office Action for U.S. Appl. No. 13/174,306, dated Mar. 2, 2015, 16 pages, USA.
U.S. Patent and Trademark Office, Office Action for U.S. Appl. No. 13/569,316, dated Mar. 3, 2015, 18 pages, USA.
U.S. Patent and Trademark Office, Office Action for U.S. Appl. No. 13/174,248, dated Mar. 4, 2015, 16 pages, USA.
U.S. Patent and Trademark Office, Office Action for U.S. Appl. No. 13/913,191, dated Mar. 10, 2015, 15 pages, USA.
U.S. Patent and Trademark Office, Office Action for U.S. Appl. No. 13/913,198, dated Mar. 11, 2015, 14 pages, USA.
U.S. Patent and Trademark Office, Office Action for U.S. Appl. No. 13/465,555, dated Mar. 12, 2015, 11 pages, USA.
U.S. Patent and Trademark Office, Office Action for U.S. Appl. No. 13/913,066, dated Mar. 20, 2015, 14 pages, USA.
United States Patent and Trademark Office, Notice of Allowance for U.S. Appl. No. 13/913,066, dated Feb. 5, 2014, 11 pages, USA.
United States Patent and Trademark Office, Notice of Allowance for U.S. Appl. No. 13/913,171, dated Feb. 11, 2014, 45 pages, USA.
United States Patent and Trademark Office, Notice of Allowance for U.S. Appl. No. 13/913,191, dated Feb. 20, 2014, 25 pages, USA.
United States Patent and Trademark Office, Notice of Allowance for U.S. Appl. No. 13/913,198, dated Mar. 6, 2014, 7 pages, USA.
United States Patent and Trademark Office, Notice of Allowance for U.S. Appl. No. 13/326,750, dated Jun. 17, 2014, 17 pages, USA.
United States Patent and Trademark Office, Office Action for U.S. Appl. No. 13/569,316, dated Sep. 19, 2012,18 pages, USA.
United States Patent and Trademark Office, Office Action for U.S. Appl. No. 13/569,316, dated Nov. 6, 2012, 14 pages, USA.
United States Patent and Trademark Office, Office Action for U.S. Appl. No. 13/174,269, dated Nov. 7, 2012, 23 pages, USA.
United States Patent and Trademark Office, Office Action for U.S. Appl. No. 13/174,248, dated Nov. 27, 2012, 24 pages, USA.
United States Patent and Trademark Office, Office Action for U.S. Appl. No. 13/174,290, dated Nov. 28, 2012, 25 pages, USA.
United States Patent and Trademark Office, Office Action for U.S. Appl. No. 13,174,269, dated May 8, 2013, 14 pages, USA.
United States Patent and Trademark Office, Office Action for U.S. Appl. No. 13/569,316, dated May 10, 2013, 14 pages, USA.
United States Patent and Trademark Office, Office Action for U.S. Appl. No. 13,174,248, dated May 16, 2013, 13 pages, USA.
United States Patent and Trademark Office, Office Action for U.S. Appl. No. 13,174,306, dated May 21, 2013, 14 pages, USA.
United States Patent and Trademark Office, Office Action for U.S. Appl. No. 13,174,290, dated May 15, 2013, 13 pages, USA.
United States Patent and Trademark Office, Office Action for U.S. Appl. No. 13/181,185, dated Apr. 9, 2013, 19 pages, USA.
United States Patent and Trademark Office, Office Action for U.S. Appl. No. 13/913,185, dated Dec. 13, 2013, 31 pages, USA.
United States Patent and Trademark Office, Office Action for U.S. Appl. No. 13/913,171, dated Oct. 2, 2013, 36 pages, USA.
United States Patent and Trademark Office, Office Action for U.S. Appl. No. 13/746,854, dated Oct. 2, 2013, 30 pages, USA.
United States Patent and Trademark Office, Office Action for U.S. Appl. No. 13/174,290, dated Aug. 29, 2013, 15 pages, USA.
United States Patent and Trademark Office, Office Action for U.S. Appl. No. 13/174,269, dated Aug. 29, 2013, 14 pages, USA.
United States Patent and Trademark Office, Office Action for U.S. Appl. No. 13,174,306, dated Aug. 29, 2013, 14 pages, USA.
United States Patent and Trademark Office, Office Action for U.S. Appl. No. 13/569,316, dated Aug. 29, 2013, 15 pages, USA.
United States Patent and Trademark Office, Office Action for U.S. Appl. No. 13/181,185, dated Sep. 26, 2013, 27 pages, USA.
United States Patent and Trademark Office, Office Action for U.S. Appl. No. 13/746,862, dated Oct. 8, 2013, 31 pages, USA.
United States Patent and Trademark Office, Office Action for U.S. Appl. No. 13/174,248, dated Sep. 6, 2013, 14 pages, USA.
United States Patent and Trademark Office, Office Action for U.S. Appl. No. 13/913,066, dated Oct. 11, 2013, 22 pages, USA.
United States Patent and Trademark Office, Office Action for U.S. Appl. No. 13/746,842, dated Oct. 2, 2013, 28 pages, USA.
United States Patent and Trademark Office, Office Action for U.S. Appl. No. 13,174,306, dated Dec. 28, 2012, 27 pages, USA.
United States Patent and Trademark Office, Office Action for U.S. Appl. No. 13,174,269, dated Feb. 4, 2013, 13 pages, USA.
United States Patent and Trademark Office, Office Action for U.S. Appl. No. 13/569,316, dated Feb. 6, 2013, 11 pages, USA.
United States Patent and Trademark Office, Office Action for U.S. Appl. No. 13,174,248, dated Feb. 12, 2013, 11 pages, USA.
United States Patent and Trademark Office, Office Action for U.S. Appl. No. 13,174,306, dated Feb. 15, 2013, 11 pages, USA.
United States Patent and Trademark Office, Office Action for U.S. Appl. No. 13,174,290, dated Feb. 21, 2013, 12 pages, USA.
United States Patent and Trademark Office, Office Action for U.S. Appl. No. 13/913,191, dated Oct. 24, 2013, 26 pages, USA.
United States Patent and Trademark Office, Office Action for U.S. Appl. No. 13/913,198, dated Oct. 25, 2013, 25 pages, USA.
United States Patent and Trademark Office, Office Action for U.S. Appl. No. 10/696,180, dated Jul. 18, 2013, 38 pages, USA.
United States Patent and Trademark Office, Office Action for U.S. Appl. No. 13/174,299, dated Dec. 31, 2012, 27 pages, USA.

(56) References Cited

OTHER PUBLICATIONS

United States Patent and Trademark Office, Office Action for U.S. Appl. No. 13/174,299, dated Feb. 8, 2013, 9 pages, USA.
United States Patent and Trademark Office, Office Action for U.S. Appl. No. 13/174,299, dated May 15, 2013, 13 pages, USA.
United States Patent and Trademark Office, Office Action for U.S. Appl. No. 13/174,299, dated Aug. 29, 2013, 13 pages, USA.
United States Patent and Trademark Office, Office Action for U.S. Appl. No. 13/326,807, dated Feb. 5, 2014, 29 pages, USA.
United States Patent and Trademark Office, Office Action for U.S. Appl. No. 13/326,887, dated Feb. 13, 2014, 29 pages, USA.
United States Patent and Trademark Office, Office Action for U.S. Appl. No. 13/174,248, dated Dec. 27, 2013, 12 pages, USA.
United States Patent and Trademark Office, Office Action for U.S. Appl. No. 13/746,862, dated Dec. 23, 2013, 16 pages, USA.
United States Patent and Trademark Office, Office Action for U.S. Appl. No. 13/746,842, dated Feb. 13, 2014, 16 pages, USA.
United States Patent and Trademark Office, Office Action for U.S. Appl. No. 13/174,299, dated Dec. 27, 2013, 11 pages, USA.
United States Patent and Trademark Office, Office Action for U.S. Appl. No. 13/174,290, dated Dec. 27, 2013, 12 pages, USA.
United States Patent and Trademark Office, Office Action for U.S. Appl. No. 13/174,269, dated Dec. 27, 2013, 12 pages, USA.
United States Patent and Trademark Office, Office Action for U.S. Appl. No. 13/746,854, dated Dec. 27, 2013, 15 pages, USA.
United States Patent and Trademark Office, Office Action for U.S. Appl. No. 13/174,306, dated Dec. 26, 2013, 12 pages, USA.
United States Patent and Trademark Office, Office Action for U.S. Appl. No. 13/569,316, dated Dec. 24, 2013, 13 pages, USA.
United States Patent and Trademark Office, Office Action for U.S. Appl. No. 13/326,750, dated Jan. 30, 2014, 28 pages, USA.
United States Patent and Trademark Office, Office Action for U.S. Appl. No. 13/326,851, dated Feb. 21, 2014, 29 pages, USA.
United States Patent and Trademark Office, Office Action for U.S. Appl. No. 10/696,180, dated Mar. 13, 2014, 30 pages, USA.
United States Patent and Trademark Office, Office Action for U.S. Appl. No. 13/181,185, dated Mar. 27, 2014, 21 pages, USA.
United States Patent and Trademark Office, Office Action for U.S. Appl. No. 13/913,185, dated May 16, 2014, 25 pages, USA.
United States Patent and Trademark Office, Office Action for U.S. Appl. No. 13/326,807, dated Jun. 26, 2014, 19 pages, USA.
United States Patent and Trademark Office, Office Action for U.S. Appl. No. 13/326,851, dated Aug. 5, 2014, 39 pages, USA.
United States Patent and Trademark Office, Office Action for U.S. Appl. No. 13/174,269, dated Aug. 18, 2014, 21 pages, USA.
United States Patent and Trademark Office, Office Action for U.S. Appl. No. 13/174,306, dated Aug. 18, 2014, 21 pages, USA.
United States Patent and Trademark Office, Office Action for U.S. Appl. No. 13/174,248, dated Aug. 18, 2014, 21 pages, USA.
United States Patent and Trademark Office, Office Action for U.S. Appl. No. 13/174,299, dated Aug. 18, 2014, 20 pages, USA.
United States Patent and Trademark Office, Office Action for U.S. Appl. No. 13/174,290, dated Aug. 18, 2014, 20 pages, USA.
United States Patent and Trademark Office, Office Action for U.S. Appl. No. 13/746,842, dated Aug. 19, 2014, 22 pages, USA.
United States Patent and Trademark Office, Office Action for U.S. Appl. No. 13/746,854, dated Aug. 19, 2014, 20 pages, USA.
United States Patent and Trademark Office, Office Action for U.S. Appl. No. 13/746,862, dated Aug. 20, 2014, 21 pages, USA.
United States Patent and Trademark Office, Office Action for U.S. Appl. No. 13/569,316, dated Aug. 22, 2014, 20 pages, USA.
United States Patent and Trademark Office, Office Action for U.S. Appl. No. 13/762,969, dated Aug. 29, 2014, 3 8 pages, USA.
United States Patent and Trademark Office, Office Action for U.S. Appl. No. 13/326,750, dated Sep. 5, 2014, 7 pages, USA.
United States Patent and Trademark Office, Office Action for U.S. Appl. No. 13/326,807, dated Sep. 18, 2014, 6 pages, USA.
United States Patent and Trademark Office, Office Action for U.S. Appl. No. 13/326,887, dated Sep. 25, 2014, 16 pages, USA.
United States Patent and Trademark Office, Office Action for U.S. Appl. No. 13/465,555, dated Oct. 7, 2014, 42 pages, USA.
United States Patent and Trademark Office, Office Action for U.S. Appl. No. 13/181,185, dated Nov. 7, 2014, 25 pages, USA.
United States Patent and Trademark Office, Office Action for U.S. Appl. No. 13/913,171, dated Nov. 20, 2014, 13 pages, USA.
United States Patent and Trademark Office, Office Action for U.S. Appl. No. 13/465,555, dated Nov. 20, 2014, 9 pages, USA.
United States Patent and Trademark Office, Office Action for U.S. Appl. No. 13/913,066, dated Nov. 26, 2014, 17 pages, USA.
United States Patent and Trademark Office, Office Action for U.S. Appl. No. 13/913,198, dated Dec. 1, 2014, 15 pages, USA.
United States Patent and Trademark Office, Office Action for U.S. Appl. No. 13/913,191, dated Dec. 5, 2014, 17 pages, USA.
United States Patent and Trademark Office, Office Action for U.S. Appl. No. 13/913,171, dated Mar. 24, 2015, 13 pages, USA.
United States Patent and Trademark Office, Office Action for U.S. Appl. No. 13/326,807, dated Apr. 7, 2015, 19 pages, USA.
United States Patent and Trademark Office, Office Action for U.S. Appl. No. 13/326,887, dated Apr. 9, 2015, 20 pages, USA.
United States Patent and Trademark Office, Office Action for U.S. Appl. No. 13/762,969, dated Apr. 14, 2015, 12 pages, USA.
United States Patent and Trademark Office, Office Action for U.S. Appl. No. 13/326,750, dated Apr. 20, 2015, 18 pages, USA.
United States Patent and Trademark Office, Office Action for U.S. Appl. No. 13/326,851, dated Apr. 29, 2015, 21 pages, USA.
United States Patent and Trademark Office, Office Action for U.S. Appl. No. 13/913,185, dated Jun. 15, 2015, 21 pages, USA.
United States Patent and Trademark Office, Office Action for U.S. Appl. No. 13/181,185, dated Jun. 10, 2015, 29 pages, USA.
United States Patent and Trademark Office, Office Action for U.S. Appl. No. 10/696,180, dated Jun. 25, 2015, 45 pages, USA.
United States Patent and Trademark Office, Office Action for U.S. Appl. No. 13/465,555, dated Jul. 17, 2015, 12 pages, U.S.A.
United States Patent and Trademark Office, Office Action for U.S. Appl. No. 13/569,316, dated Jul. 23, 2015, 21 pages, U.S.A.
United States Patent and Trademark Office, Office Action for U.S. Appl. No. 13/746,854, dated Jul. 23, 2015, 21 pages, U.S.A.
United States Patent and Trademark Office, Office Action for U.S. Appl. No. 13/174,269, dated Jul. 23, 2015, 15 pages, U.S.A.
United States Patent and Trademark Office, Office Action for U.S. Appl. No. 13/746,862, dated Jul. 23, 2015, 21 pages, U.S.A.
United States Patent and Trademark Office, Office Action for U.S. Appl. No. 13/746,842, dated Jul. 23, 2015, 22 pages, U.S.A.
United States Patent and Trademark Office, Office Action for U.S. Appl. No. 13/174,290, dated Jul. 23, 2015, 19 pages, U.S.A.
United States Patent and Trademark Office, Office Action for U.S. Appl. No. 13/174,248, dated Jul. 23, 2015, 20 pages, U.S.A.
United States Patent and Trademark Office, Office Action for U.S. Appl. No. 13/174,306, dated Jul. 23, 2015, 20 pages, U.S.A.
United States Patent and Trademark Office, Office Action for U.S. Appl. No. 13/174,299, dated Jul. 23, 2015, 19 pages, U.S.A.
United States Patent and Trademark Office, Office Action for U.S. Appl. No. 13/839,398, dated Jul. 7, 2015, 8 pages, USA.
United States Patent and Trademark Office, Office Action for U.S. Appl. No. 13/913,198, dated Sep. 24, 2015, 24 pages, U.S.A.
United States Patent and Trademark Office, Office Action for U.S. Appl. No. 13/913,191, dated Sep. 24, 2015, 23 pages, U.S.A.
United States Patent and Trademark Office, Office Action for U.S. Appl. No. 10/696,180, dated Oct. 8, 2015, 27 pages, U.S.A.
United States Patent and Trademark Office, Office Action for U.S. Appl. No. 13/913,185, dated Oct. 20, 2015, 20 pages, U.S.A.
United States Patent and Trademark Office, Office Action for U.S. Appl. No. 13/174,299, dated Nov. 10, 2015, 15 pages, U.S.A.
United States Patent and Trademark Office, Office Action for U.S. Appl. No. 13/913,066, dated Nov. 13, 2015, 24 pages, U.S.A.
United States Patent and Trademark Office, Office Action for U.S. Appl. No. 13/174,306, dated Nov. 17, 2015, 17 pages, U.S.A.
United States Patent and Trademark Office, Office Action for U.S. Appl. No. 13/174,290, dated Nov. 17, 2015, 16 pages, U.S.A.
United States Patent and Trademark Office, Office Action for U.S. Appl. No. 13/174,269, dated Nov. 17, 2015, 17 pages, U.S.A.

(56) References Cited

OTHER PUBLICATIONS

United States Patent and Trademark Office, Office Action for U.S. Appl. No. 13/174,248, dated Nov. 17, 2015, 20 pages, U.S.A.
United States Patent and Trademark Office, Office Action for U.S. Appl. No. 13/569,316, dated Nov. 17, 2015, 21 pages, U.S.A.
United States Patent and Trademark Office, Office Action for U.S. Appl. No. 13/746,854, dated Nov. 17, 2015, 17 pages, U.S.A.
United States Patent and Trademark Office, Office Action for U.S. Appl. No. 13/746,862, dated Nov. 17, 2015, 18 pages, U.S.A.
Van Huzien, "Messaging: the Transport Part of the XML Puzzle," *IBM Developer Works*, Jul. 2000, www.106.ibm/developerworks/library/xml-messaging/.
United States Patent and Trademark Office, Office Action for U.S. Appl. No. 13/839,398, dated Feb. 22, 2016, 9 pages, U.S.
United States Patent and Trademark Office, Office Action for U.S. Appl. No. 13/181,185, dated Apr. 13, 2016, 34 pages, U.S.
United States Patent and Trademark Office, Office Action for U.S. Appl. No. 13/465,555, dated Mar. 17, 2016, 22 pages, U.S.
United States Patent and Trademark Office, Office Action for U.S. Appl. No. 14/100,556, dated Mar. 25, 2016, 54 pages, U.S.
Non-Final Rejection dated Jun. 14, 2017 for U.S. Appl. No. 14/049,605.
Final Rejection dated Jun. 29, 2017 for U.S. Appl. No. 13/746,842.
Final Rejection dated Jun. 29, 2017 for U.S. Appl. No. 13/569,316.
Final Rejection dated Jun. 27, 2017 for U.S. Appl. No. 13/174,248.
Final Rejection dated Jun. 5, 2017 for U.S. Appl. No. 13/839,398.
English Translation of CN Office Action dated Jun. 27, 2017 for CN Application No. 201380070843.
English Translation of CN Office Action dated Apr. 27, 2017 for CN Application No. 201380067429.
Communication from the Examining Division dated Apr. 10, 2017 for EP Application No. 06773704.
CN Office Action dated Jun. 27, 2017 for CN Application No. 201380070843.
CN Office Action dated Apr. 27, 2017 for CN Application No. 201380067429.
CA Office Action dated May 24, 2017 for CA Application No. 2885818.
CA Office Action dated May 23, 2017 for CA Application No. 2891876.
CA Office Action dated Jun. 6, 2017 for CA Application No. 2881201.
CA Office Action dated Apr. 27, 2017 for CA Application No. 2884747.
Annex to the communication dated Apr. 10, 2017 for EP Application No. 06773704.
Canadian Intellectual Property Office, Requisition by the Examiner for Application No. 2,924,132, dated Feb. 10, 2017, 4 pages, Canada.
European Patent Office, Communications pursuant to Article 94(3) EPC for Application No. 13796181.9, dated Feb. 10, 2017, 5 pages, Germany.
European Patent Office, Communications pursuant to Article 94(3) EPC for Application No. 13795343.6, dated Mar. 2, 2017, 5 pages, Germany.
European Patent Office, Communications pursuant to Article 94(3) EPC for Application No. 13158961.6, dated Mar. 3, 2017, 6 pages, Germany.
European Patent Office, Communications pursuant to Article 94(3) EPC for Application No. 13158964.0, dated Mar. 23, 2017, 7 pages, Germany.
European Patent Office, Communications pursuant to Article 94(3) EPC for Application No. 13158965.7, dated Mar. 23, 2017, 7 pages, Germany.
European Patent Office, Communications pursuant to Article 94(3) EPC for Application No. 13158966.5, dated Mar. 23, 2017, 6 pages, Germany.
European Patent Office, Communications pursuant to Article 94(3) EPC for Application No. 13158967.3, dated Mar. 23, 2017, 7 pages, Germany.
United States Patent and Trademark Office, Office Action for U.S. Appl. No. 13/465,555, dated Mar. 15, 2017, 13 pages, U.S.A.
United States Patent and Trademark Office, Office Action for U.S. Appl. No. 13/746,854, dated Mar. 9, 2017, 34 pages, U.S.A.
United States Patent and Trademark Office, Office Action for U.S. Appl. No. 13/746,862, dated Feb. 27, 2017, 43 pages, U.S.A.
United States Patent and Trademark Office, Office Action for U.S. Appl. No. 13/913,185, dated Mar. 23, 2017, 36 pages, U.S.A.
United States Patent and Trademark Office, Office Action for U.S. Appl. No. 14/049,828, dated May 3, 2017, 24 pages, U.S.A.
United States Patent and Trademark Office, Office Action for U.S. Appl. No. 14/100,556, dated May 1, 2017, 25 pages, U.S.A.
United States Patent and Trademark Office, Office Action for U.S. Appl. No. 14/025,893, dated Apr. 7, 2017, 27 pages, U.S.A.
Canadian Intellectual Property Office, Requisition by the Examiner for Application No. 2,885,818, dated May 30, 2016, 4 pages, Canada.
Canadian Intellectual Property Office, Requisition by the Examiner for Application No. 2,884,747, dated May 30, 2016, 4 pages, Canada.
European Patent Office, Communication Pursuant to Rules 70(2) and 70a(2) EPC for Application No. 13796181.9, dated May 24, 2016, 9 pages, Germany.
European Patent Office, Extended European Search Report for Application No. 13821253.5, dated May 17, 2016, 11 pages, Germany.
European Patent Office, Extended European Search Report for Application No. 13795343.6, dated May 19, 2016, 9 pages, Germany.
United States Patent and Trademark Office, Office Action for U.S. Appl. No. 10/696,180, dated Jun. 1, 2016, 28 pages, U.S.A.
United States Patent and Trademark Office, Office Action for U.S. Appl. No. 13/913,066, dated May 27, 2016, 25 pages, U.S.A.
United States Patent and Trademark Office, Office Action for U.S. Appl. No. 13/913,171, dated Jun. 8, 2016, 22 pages, U.S.A.
Untied States Patent and Trademark Office, Office Action for U.S. Appl. No. 13/913,198, dated Jun. 14, 2016, 23 pages, U.S.A.
United States Patent and Trademark Office, Office Action for U.S. Appl. No. 13/913,191, dated Jun. 9, 2016, 24 pages, U.S.A.
Non-Final Rejection dated Jul. 21, 2017 for U.S. Appl. No. 14/640,753.
Non-Final Rejection dated Aug. 4, 2017 for U.S. Appl. No. 13/181,185.
Final Rejection dated Sep. 11, 2017 for U.S. Appl. No. 13/913,185.
Final Rejection dated Jul. 28, 2017 for U.S. Appl. No. 13/913,198.
Final Rejection dated Jul. 18, 2017 for U.S. Appl. No. 13/913,171.
Final Rejection dated Jul. 11, 2017 for U.S. Appl. No. 13/746,854.
Final Rejection dated Jul. 10, 2017 for U.S. Appl. No. 13/913,191.
Final Rejection dated Jul. 10, 2017 for U.S. Appl. No. 13/746,862.
English Translation of CN Office Action dated Jun. 29, 2017 for CN Application No. 201380070854.
CN Office Action dated Jun. 29, 2017 for CN Application No. 201380070854.
CA Office Action dated Jul. 11, 2017 for CA Application No. 2942296.
Final Office Action for U.S. Appl. No. 14/640,753, filed Jan. 16, 2018, 37 pages.
EPO Summons to Attend Oral Hearing for Application No. 13795343. 6, dated Nov. 17, 2017, 9.
CA Office Action dated Nov. 22, 2017 for CA Application No. 2954156.
CA Office Action dated Nov. 20, 2017 for CA Application No. 2924132.
CA Office Action dated Dec. 27, 2017 for CA Application No. 2957135.
CA Office Action dated Dec. 22, 2017 for CA Application No. 2957133.
Non-Final Rejection dated Oct. 24, 2017 for U.S. Appl. No. 13/913,066.
Non-Final Rejection dated Nov. 22, 2017 for U.S. Appl. No. 14/025,893.
Non-Final Rejection dated Nov. 13, 2017 for U.S. Appl. No. 14/707,039.
Non-Final Rejection dated Nov. 8, 2017 for U.S. Appl. No. 10/696,180.
Final Rejection dated Sep. 20, 2017 for U.S. Appl. No. 14/100,556.
Final Rejection dated Oct. 2, 2017 for U.S. Appl. No. 14/049,605.

(56) References Cited

OTHER PUBLICATIONS

Annex to the communication dated Sep. 15, 2017 for EP Application No. 06773704.
Annex to the communication dated Oct. 12, 2017 for EP Application No. 13796181.
Canadian Office Action dated Jan. 31, 2018 in Canadian patent Application No. 2,884,747, 6 pages.
European Office Action dated Feb. 1, 2018 in European Application 13821253.5, 11 pages.
European Office Action dated Feb. 2, 2018 in European Application 13821253.5, 11 pages.
Office Action received for Canadian Patent Application No. 2,935,200, dated Apr. 11, 2018, 4 pages.

\* cited by examiner

| Mondays | Tuesdays | Wednesdays | Thursdays | Fridays | Saturdays | Sundays | National Holidays |
|---|---|---|---|---|---|---|---|
| 105 Main Street Atlanta, GA 30309 USA | 105 Main Street Atlanta, GA 30309 USA | 105 Main Street Atlanta, GA 30309 USA | 105 Main Street Atlanta, GA 30309 USA | 71 Lanier Islands Buford, GA 30518 USA | 71 Lanier Islands Buford, GA 30518 USA | 71 Lanier Islands Buford, GA 30518 USA | 71 Lanier Islands Buford, GA 30518 USA |

FIG. 5

| Time | Mondays | Tuesdays | Wednesdays | Thursdays | Fridays | Saturdays | Sundays | National Holidays |
|---|---|---|---|---|---|---|---|---|
| 7:00am – 9:00am | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 71 Lanier Islands Buford, GA 30518 USA | 71 Lanier Islands Buford, GA 30518 USA | 71 Lanier Islands Buford, GA 30518 USA |
| 9:00am – 5:00pm | 1201 W Peachtree Atlanta, GA 30309 USA | 1201 W Peachtree Atlanta, GA 30309 USA | 1201 W Peachtree Atlanta, GA 30309 USA | 1201 W Peachtree Atlanta, GA 30309 USA | 71 Lanier Islands Buford, GA 30518 USA | 71 Lanier Islands Buford, GA 30518 USA | 71 Lanier Islands Buford, GA 30518 USA | 71 Lanier Islands Buford, GA 30518 USA |
| 5:00pm – 9:00pm | 105 Main Street Atlanta, GA 30309 USA | 105 Main Street Atlanta, GA 30309 USA | 105 Main Street Atlanta, GA 30309 USA | 105 Main Street Atlanta, GA 30309 USA | 71 Lanier Islands Buford, GA 30518 USA | 71 Lanier Islands Buford, GA 30518 USA | 71 Lanier Islands Buford, GA 30518 USA | 71 Lanier Islands Buford, GA 30518 USA |

FIG. 6

DETERMINING A DELIVERY LOCATION AND TIME BASED ON THE SCHEDULE OR LOCATION OF A CONSIGNEE

CROSS-REFERENCE TO RELATED APPLICATIONS

This application claims priority to U.S. Provisional Application No. 61/940,441 filed Feb. 16, 2014, which is hereby incorporated herein in its entirety by reference.

BACKGROUND

Traditionally, when a package is shipped, the package includes a shipping label that indicates both the consignee's name and delivery address. The delivery address may be a static physical location. However, the person identified as the consignee may not be at the delivery address during the time window when a package is scheduled to be delivered. In which case, a carrier may have to make multiple trips to the address to complete the delivery. This represents an inefficient use of carrier resources.

In other instances, a consignee may cancel other activities to ensure his or her presence at a delivery address to receive a scheduled package delivery. As a result, the consignee's movement is constrained due to the impending delivery of the package. Accordingly, a need exists for improved delivery options and methods that can accommodate consignee location changes.

In this regard, areas for improving current systems have been identified. Through applied effort, ingenuity, and innovation, solutions to improve such systems have been realized and are described in connection with embodiments of the present invention.

BRIEF SUMMARY

In general, embodiments of the present invention provide systems, methods, apparatus, and computer program products for programmatically determining/identifying a delivery location and time based on the schedule of the consignee.

In some embodiments, a method may be provided for providing information/data identifying where and when delivery of an item/parcel is to be occur. The method may comprise, the method comprising receiving shipping/parcel information/data, the shipping/parcel information/data indicative of an item/parcel to be delivered to a consignee by a carrier, the shipping/parcel information/data comprising at least a default delivery location and estimated time of delivery, determining whether consignee schedule information/data is accessible, the consignee schedule information/data comprising information/data indicative of a consignee and information/data indicative of one or more location-time pairs, each location-time pair indicative of a location and an associated time at which the consignee has indicated an ability to receive an item, in an instance in which the consignee schedule information/data is not accessible, querying for a location tracking application on a client device associated with the consignee or prompting, via a user interface, for one or more portions of the consignee schedule information, the one or more portions of the consignee schedule information/data being at least one location-time pair, and providing, to a client device, via a network, a delivery location and a delivery time, the delivery location and the delivery time determined between the one or more location-time pairs and the default delivery location and the estimated time of delivery.

In some embodiments, the method may further comprise, in an instance in which the consignee schedule information/data is not accessible, providing, via the network, to the client device, the user interface configured to prompt for and receive the consignee schedule information, and receiving the consignee schedule information. In some embodiments, the method may further comprise, in an instance in which the consignee schedule information/data is not accessible, providing, to a particular application on a client device, notification of the item/parcel, and a request for location information/data and duration information, and receiving the location and duration information.

In some embodiments, determination between the one or more location-time pairs and the default delivery location and the estimated time of delivery is determined by calculating an impact of delivering the item/parcel according to each of the one or more location-time pairs and the default delivery location and the estimated time of delivery, and selecting a least impactful delivery location and delivery time.

In some embodiments, the method may further comprise determining/identifying whether the item will be delivered by a first carrier service or a second carrier service. In some embodiments, the method may further comprise, in an instance in which the determination yields that the item will be delivered by the first carrier service, determining, via one or more processors, the delivery time and the delivery location by (1) calculating an impact of delivery to each location at the associated time considering, for each of one or more vehicles available to deliver the item/parcel, one or more of (i) other parcels on the vehicle, (ii) traffic analysis, and (iii) fuel consumption, (2) selecting the least impactful delivery location and delivery time In some embodiments, the method may further comprise, in an instance in which the determination yields that the item will be delivered by the second carrier service, providing the consignee schedule information, via a network, to a second carrier system, the second carrier system associated with the second carrier service, the second carrier system configured to determine the delivery location and the delivery time based on the consignee schedule information, and receiving, via the network, from the second carrier system, information/data indicative of the delivery location and the delivery time.

In some embodiments, the method may further comprise storing communication preferences for providing information/data indicative of the delivery location and the delivery time, wherein the communication preferences (1) identify at least one communication format and at least one corresponding electronic destination address to be used in providing the information/data to the customer, and (2) define a time period prior to a first carrier attempt of the item in which a message providing the information/data is to be transmitted to the at least one corresponding electronic destination address, automatically generating a message providing the information/data regarding the item to be delivered to the customer, and automatically transmitting the message to the at least one corresponding electronic destination address within the defined time period prior to the first carrier attempt of the item to the customer. In some embodiments, the at least one communication format is selected from the group consisting of a text message, an email message, a voice message, a picture message, a video message, and a social media message.

In some embodiments, an apparatus may be provided configured for providing, via network, information/data identifying where and when delivery of an item/parcel will be made, the apparatus comprising a processor including one or more processing devices configured to perform independently or in tandem to execute hard-coded functions or execute software instructions, a user interface, a communications module, and a memory comprising one or more volatile or non-volatile electronic storage devices storing computer-readable instructions configured, when executed, to cause the processor to receive shipping/parcel information/data, the shipping/parcel information/data indicative of an item/parcel to be delivered to a consignee by a carrier, the shipping/parcel information/data comprising at least a default delivery location and estimated time of delivery, determine whether consignee schedule information/data is accessible, the consignee schedule information/data comprising information/data indicative of a consignee and information/data indicative of one or more location-time pairs, each location-time pair indicative of a location and an associated time at which the consignee has indicated an ability to receive an item, in an instance in which the consignee schedule information/data is not accessible, query for a location tracking application on a client device associated with the consignee or prompt, via a user interface, for one or more portions of the consignee schedule information, the one or more portions of the consignee schedule information/data being at least one location-time pair, and provide, to a client device, via a network, a delivery location and a delivery time, the delivery location and the delivery time determined between the one or more location-time pairs and the default delivery location and the estimated time of delivery.

In some embodiments, the memory stores computer-readable instructions that, when executed, cause the processor to in an instance in which the consignee schedule information/data is not accessible, provide, via the network, to the client device, the user interface configured to prompt for and receive the consignee schedule information, and receive the consignee schedule information. In some embodiments, the memory stores computer-readable instructions that, when executed, cause the processor to in an instance in which the consignee schedule information/data is not accessible, provide, to a particular application on a client device, notification of the item/parcel, and a request for location information/data and duration information, and receive the location and duration information.

In some embodiments, determination between the one or more location-time pairs and the default delivery location and the estimated time of delivery is determined by calculating an impact of delivering the item/parcel according to each of the one or more location-time pairs and the default delivery location and the estimated time of delivery, and selecting a least impactful delivery location and delivery time In some embodiments, the memory stores computer-readable instructions that, when executed, cause the processor to determine/identify whether the item will be delivered by a first carrier service or a second carrier service. In some embodiments, the memory stores computer-readable instructions that, when executed, cause the processor to in an instance in which the determination yields that the item will be delivered by the first carrier service, determine, via one or more processors, the delivery time and the delivery location by (1) calculating an impact of delivery to each location at the associated time considering, for each of one or more vehicles available to deliver the item/parcel, one or more of (i) other parcels on the vehicle, (ii) traffic analysis, and (iii) fuel consumption, and (2) selecting the least impactful delivery location and delivery time. In some embodiments, the memory stores computer-readable instructions that, when executed, cause the processor to in an instance in which the determination yields that the item will be delivered by the second carrier service, provide the consignee schedule information, via a network, to a second carrier system, the second carrier system associated with the second carrier service, the second carrier system configured to determine the delivery location and the delivery time based on the consignee schedule information, and receive, via the network, from the second carrier system, information/data indicative of the delivery location and the delivery time.

In some embodiments, the memory stores computer-readable instructions that, when executed, cause the processor to store communication preferences for providing information/data indicative of the delivery location and the delivery time, wherein the communication preferences (1) identify at least one communication format and at least one corresponding electronic destination address to be used in providing the information/data to the customer, and (2) define a time period prior to a first carrier attempt of the item in which a message providing the information/data is to be transmitted to the at least one corresponding electronic destination address, automatically generate a message providing the information/data regarding the item to be delivered to the customer, and automatically transmit the message to the at least one corresponding electronic destination address within the defined time period prior to the first carrier attempt of the item to the customer. In some embodiments, the at least one communication format is selected from the group consisting of a text message, an email message, a voice message, a picture message, a video message, and a social media message.

In some embodiments, a computer program product may be provided configured for providing, via network, information/data identifying where and when delivery of an item/parcel will be made, the computer program product comprising at least one computer-readable storage medium having computer-executable program code instructions stored therein, the computer-executable program code instructions comprising program code instructions for receiving shipping/parcel information/data, the shipping/parcel information/data indicative of an item/parcel to be delivered to a consignee by a carrier, the shipping/parcel information/data comprising at least a default delivery location and estimated time of delivery, determining whether consignee schedule information/data is accessible, the consignee schedule information/data comprising information/data indicative of a consignee and information/data indicative of one or more location-time pairs, each location-time pair indicative of a location and an associated time at which the consignee has indicated an ability to receive an item, in an instance in which the consignee schedule information/data is not accessible, querying for a location tracking application on a client device associated with the consignee or prompting, via a user interface, for one or more portions of the consignee schedule information, the one or more portions of the consignee schedule information/data being at least one location-time pair, and providing, to a client device, via a network, a delivery location and a delivery time, the delivery location and the delivery time determined between the one or more location-time pairs and the default delivery location and the estimated time of delivery.

In some embodiments, the computer-executable program code instructions further comprise program code instructions for in an instance in which the consignee schedule information/data is not accessible, providing, via the network, to the client device, the user interface configured to prompt for and receive the consignee schedule information, and receiving the consignee schedule information. In some embodiments, the computer-executable program code instructions further comprise program code instructions for in an instance in which the consignee schedule information/data is not accessible, providing, to a particular application on a client device, notification of the item/parcel, and a request for location information/data and duration information, and receiving the location and duration information. In some embodiments, determination between the one or more location-time pairs and the default delivery location and the estimated time of delivery is determined by calculating an impact of delivering the item/parcel according to each of the one or more location-time pairs and the default delivery location and the estimated time of delivery, and selecting a least impactful delivery location and delivery time.

In some embodiments, the computer-executable program code instructions further comprise program code instructions for determining/identifying whether the item will be delivered by a first carrier service or a second carrier service. In some embodiments, the computer-executable program code instructions further comprise program code instructions for in an instance in which the determination yields that the item will be delivered by the first carrier service, determining, via one or more processors, the delivery time and the delivery location by (1) calculating an impact of delivery to each location at the associated time considering, for each of one or more vehicles available to deliver the item/parcel, one or more of (i) other parcels on the vehicle, (ii) traffic analysis, and (iii) fuel consumption, (2) selecting the least impactful delivery location and delivery time. In some embodiments, the computer-executable program code instructions further comprise program code instructions for in an instance in which the determination yields that the item will be delivered by the second carrier service, providing the consignee schedule information, via a network, to a second carrier system, the second carrier system associated with the second carrier service, the second carrier system configured to determine the delivery location and the delivery time based on the consignee schedule information, and receiving, via the network, from the second carrier system, information/data indicative of the delivery location and the delivery time.

In some embodiments, the computer-executable program code instructions further comprise program code instructions for storing communication preferences for providing information/data indicative of the delivery location and the delivery time, wherein the communication preferences (1) identify at least one communication format and at least one corresponding electronic destination address to be used in providing the information/data to the customer, and (2) define a time period prior to a first carrier attempt of the item in which a message providing the information/data is to be transmitted to the at least one corresponding electronic destination address, automatically generating a message providing the information/data regarding the item to be delivered to the customer, and automatically transmitting the message to the at least one corresponding electronic destination address within the defined time period prior to the first carrier attempt of the item to the customer. In some embodiments, the at least one communication format is selected from the group consisting of a text message, an email message, a voice message, a picture message, a video message, and a social media message.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5 and 6 show exemplary input and output of various embodiments of the present invention;

DETAILED DESCRIPTION

Figure 1:
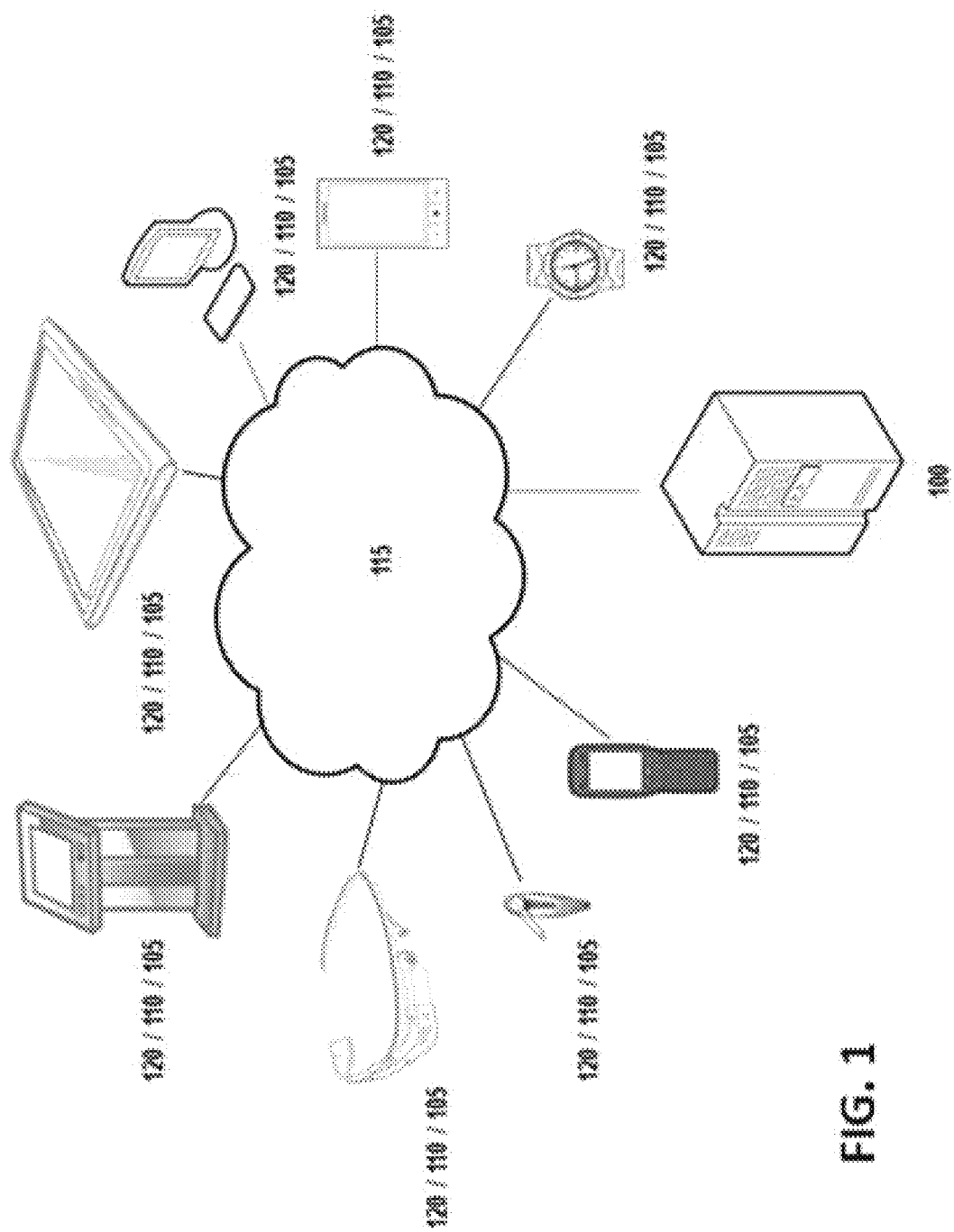
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present invention. As shown in FIG. 1, the system may include one or more carrier systems 100, one or more mobile stations 105, one or more consignee computing devices 110, and one or more networks 115, and one or more consignor computing devices 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

Figure 2:
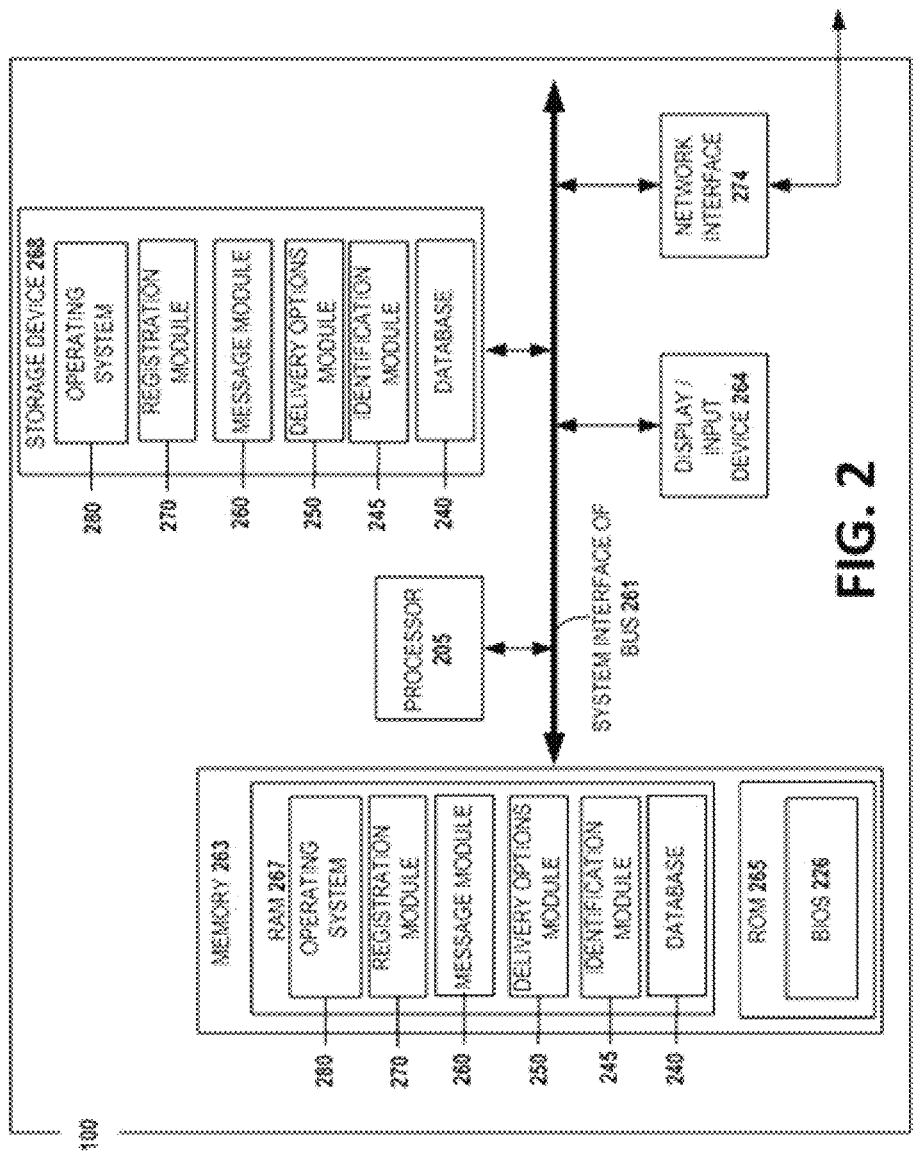
FIG. 2 is an exemplary schematic diagram of a carrier system according to one embodiment of the present invention.

FIG. 2 provides an exemplary schematic of a carrier system 100 according to one embodiment of the present invention. A carrier may be a traditional carrier, such as United parcel/item Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In certain embodiments, there may be multiple carriers, such as a primary carrier (e.g., a first carrier service using a first carrier system or a primary carrier system) or a last mile carrier (e.g., a second carrier service using a second carrier system or a secondary carrier system). As will be recognized, one carrier may be both the primary carrier and last mile carrier—i.e., only a single carrier transports the item/parcel from its origin to its destination.

In general, the term "system" may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. However, the carrier system 100 may also comprise various other systems, such as an Address Matching System (AMS), an Internet Membership System (IMS), a Customer Profile System (CPS), a Package Center information/data System (PCIS), a Customized Pickup and Delivery System (CPAD), a Web Content Management System (WCMS), a Notification Email System (NES), a Fraud Prevention System (FPS), and a variety of other systems and their corresponding components. The carrier system 100 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

As will be understood from FIG. 1, in one embodiment, the carrier system 100 includes one or more processors 205 that communicate with other elements within the carrier system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory RAM 267 and read only memory ROM 265. The carrier system's ROM 265 may be used to store a basic input/output system (BIOS) 226 containing the basic routines that help to transfer information/data to the different elements within the carrier system 100.

In addition, in one embodiment, the carrier system 100 may include at least one storage device 268, such as a hard disk drive, a CD drive, and/or an optical disk drive for storing information/data on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, a message module 260, a delivery options module 250, an identification module 245, and/or the like. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

Also located within the carrier system 100, in one embodiment, is a network interface 274 for interfacing with various computing entities (e.g., with one or more mobile stations 105). For example, the carrier system 100 may be able to receive data and/or messages from and transmit data and/or messages to the mobile station 105, consignee computing devices 110, and consignor computing devices 120. This communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Station

Figure 3:
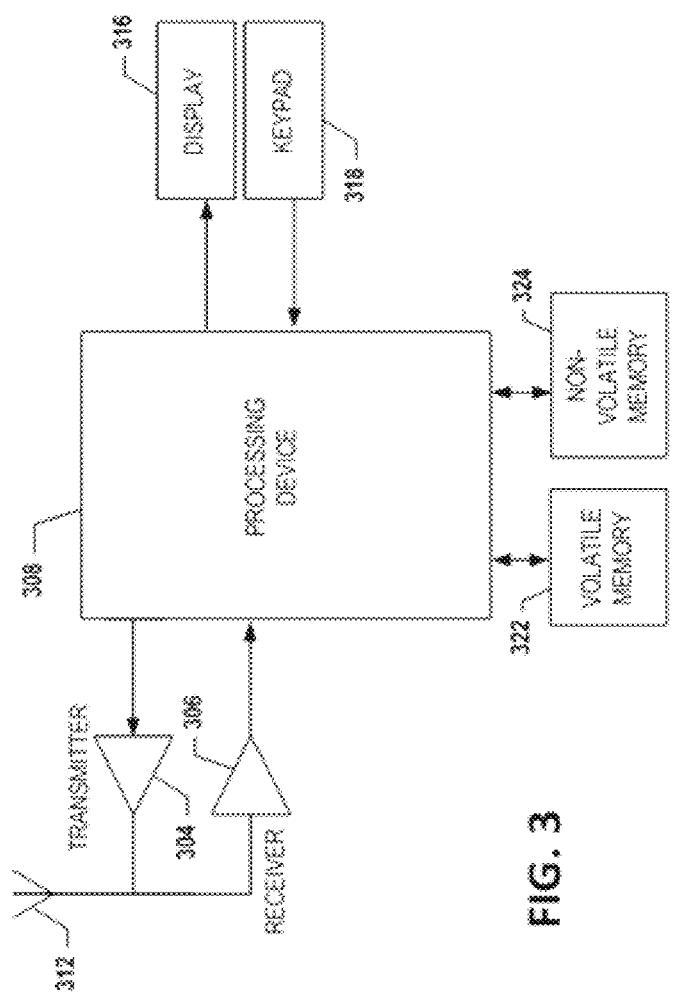
FIG. 3 is an exemplary schematic diagram of a mobile station according to one embodiment of the present invention.

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As indicated, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG.

3, the mobile station 105 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile station 105 may operate in accordance with multiple wired communication standards and protocols, such as those described above with regard to the carrier system 100 via a network interface 320.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include location determining aspects, devices, modules, functionalities, and/or similar words used herein interchangeably. For example, the mobile station 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile station's 105 position in connection with a variety of other systems, including cellular towers, Wi-Fi access points, and/or the like. Similarly, the mobile station 105 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

The mobile station 105 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile station 105 to interact with and/or cause display of information/data from the carrier system 100, as described herein. The user input interface can comprise any of a number of devices or interfaces allowing the mobile station 105 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile station 105. As indicated, this may include a user application that is resident on the entity or accessible through a browser or other user interface for communicating with the carrier system 100 and/or various other computing entities.

In another embodiment, the mobile station 105 may include one or more components or functionality that are the same or similar to those of the carrier system 100, as described in greater detail above. As will be recognized, these architectures and descriptions are provided for exemplary purposes only and are not limiting to the various embodiments.

3. Exemplary Consignee Computing Device

The consignee computing devices 110 may each include one or more components that are functionally similar to those of the carrier system 100 and/or mobile station 105. For example, in one embodiment, each of the consignee computing devices may include: (1) a processor that communicates with other elements via a system interface or bus; (2) a user interface; (3) transitory and non-transitory memory; and (4) a communications interface. As noted, the consignee computing device 110 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignee computing device 110 to interact with and/or cause display of information/data from the carrier system 100, as described herein. These architectures are provided for exemplary purposes only and are not limiting to the various embodiments. In general, the terms device, system, computing entity, entity, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. A customer may refer to either a consignor (e.g., a party shipping an item via carrier) or a consignee (e.g., a party receiving an item from a carrier). In the returns context, a consignee who received an item can become a consignor when returning an item.

4. Exemplary Consignor Computing Device

The consignor computing devices 120 may each include one or more components that are functionally similar to those of the carrier system 100, mobile station 105, and/or consignee computing device 110. For example, in one embodiment, each of the consignor computing devices may include: (1) a processor that communicates with other elements via a system interface or bus; (2) a user interface; (3) transitory and non-transitory memory; and (4) a communications interface. As noted, the consignor computing device 120 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignor computing device 120 to interact with and/or cause display of information/data from the carrier system 100, as described herein. These architectures are provided for exemplary purposes only and are not limiting to the various embodiments. A customer may refer to a consignor (e.g., a party shipping an item via carrier), a consignee (e.g., a party receiving an item from a carrier) a third party, and/or the like. In the returns context, a consignor who shipped an item can become a consignee when an item is being returned.

III. EXEMPLARY SYSTEM OPERATION

Figure 4:
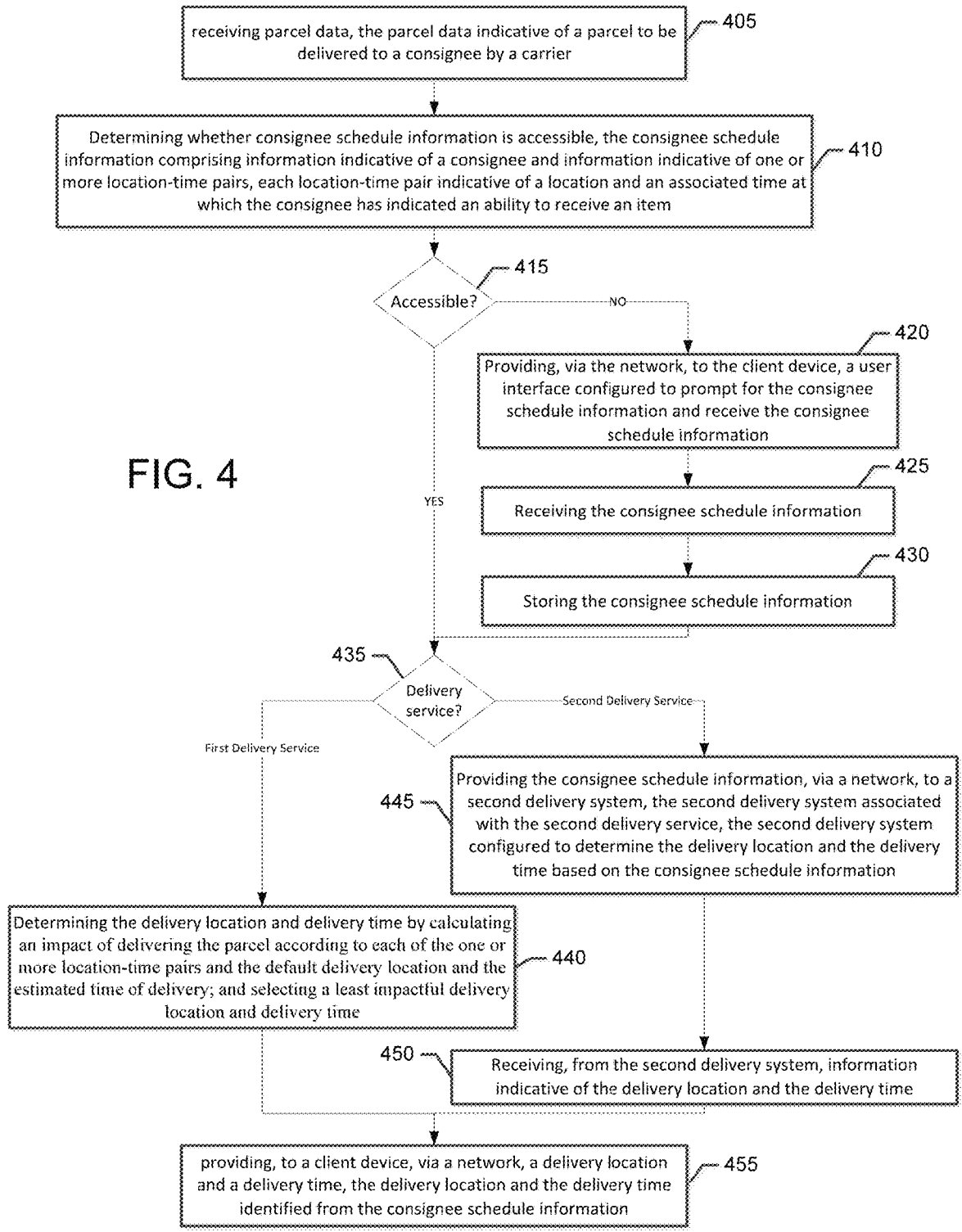
FIG. 4 is a flowchart illustrating operations and processes that can be used in accordance with various embodiments of the present invention.
Figure 7:
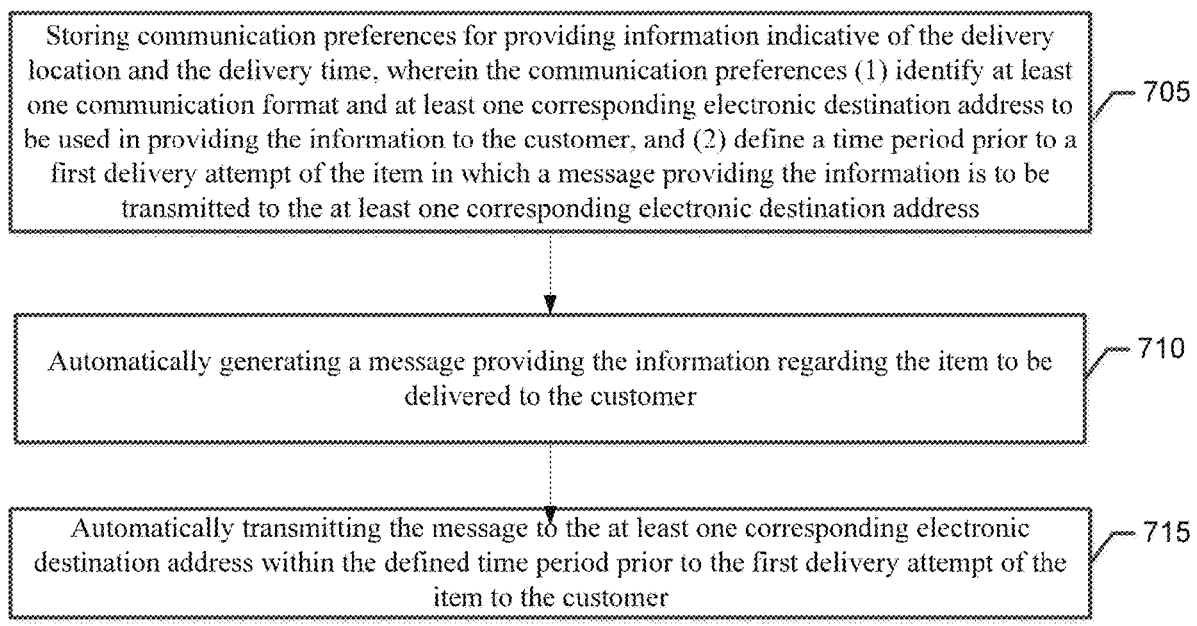
FIG. 7 shows a flowchart illustrating operations and processes that can be used in accordance with various embodiments of the present invention.

Reference will now be made to FIGS. 4-15. FIGS. 4 and 7 show flowcharts illustrating operations and processes that may be performed for providing information/data indicative of where and when delivery of an item/parcel will be made. FIGS. 5, 6, 8A, and 8B show exemplary input and output of various embodiments of the present invention. FIGS. 9-15 show data flow diagrams, each illustrating an exemplary embodiment of FIG. 4.

1. Exemplary Process

Referring to FIG. 4, a flowchart is shown illustrating a process that may be performed by a carrier system to provide a delivery location, a delivery date, and/or a delivery time at which an item/parcel may be delivery to a consignee. As is shown in operation 405, an apparatus, such as the last mile carrier system or carrier system 100, may include means, such as the processor 205 or the like, for generating or receiving shipping/parcel information/data, the shipping/parcel information/data indicative of an item or parcel/item to be delivered to a consignee by a carrier. In some embodiments, the shipping/parcel information/data may comprise at least a default delivery location and an estimated time of delivery. For example, the default delivery location may be the address on a shipping label, as indicated by, for example, the consignor. An item or parcel/item may be any tangible and/or physical object. In one embodiment, an item/parcel may be or be enclosed in one or more packages, parcels, bags, containers, loads, crates, items banded together, vehicle parts, pallets, drums, the like, and/or similar words used herein interchangeably. Such items/parcels may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, an item may communicate send "to" address information/data, received "from" address information/data, unique identifier codes, and/or various other information/data. Once shipping/parcel information/data is generated and/or received, delivery may be arranged. To arrange delivery, according to some embodiments discussed herein, a consignee's schedule may be considered. As such, in some embodiments, the carrier system 100, as is shown in operation 410, may include means for, in response to the reception of the shipping/parcel information/data, causing the identification of whether the consignee schedule information/data is accessible or otherwise available. The consignee schedule information/data may comprise information/data identifying the consignee and information/data indicative of consignee delivery preferences. Consignee delivery preferences may include, but are not limited to, one or more locations at which the consignee will be located and one or more times associated with each location indicative of when the consignee will be at the location. In some embodiments, the consignee schedule information/data may include one or more location-time pairs, each location-time pair indicative of a location and an associated time at which the consignee has indicated an ability to receive an item. For example, a location-time pair may indicate that a particular consignee is at home after waking and before 9:30 am, the location being home and the time being 6:00 am-9:30 am. A second location-time pair may then indicate that the particular consignee is at work on Mondays between 9:30 am and 6:30 pm. And as such, a second location-time pair may indicate a work address and 9:30 am-6:40 pm on Monday-Friday. In some embodiments, the consignee schedule information/data may be the same as or substantially similar to an automatic service schedule shown in FIGS. 5 and 6. As such, in some embodiments, the carrier system 100, as is shown in operation 415, may include means for determining whether consignee schedule information/data is accessible.

FIGS. 5 and 6 show exemplary consignee schedule information/data. Specifically, FIGS. 5 and 6 show exemplary service schedules that may be associated with a particular customer (e.g., consignee or consignor). As shown in FIG. 5, a customer (e.g., operating a consignee computing device 110 or consignor computing device 120) may provide a physical address from which items should be picked up or to which items should be delivered for each day of the week (including holidays). Specifically, as shown in FIG. 5, pickups from or deliveries to a customer (e.g., consignor or consignee) to which this particular schedule applies on Mondays, Tuesdays, Wednesdays, and Thursdays should be made at 105 Main Street, Atlanta, Ga. 30309, USA. However, pickups from or deliveries to this particular customer on Fridays, Saturdays, Sundays, and national holidays should be made at 71 Lanier Islands, Buford, Ga. 30518, USA. After receiving the input for the automatic service schedule preferences/requests (e.g., provided by a customer operating an appropriate computing device 110/120), the carrier system 100 can update the appropriate customer profile to reflect that items to be picked up from and/or delivered to the customer should be in accordance with the service schedule. Such automatic services schedules can be used to deliver items in accordance with the preferences regardless of the physical address to which the item is originally addressed or intended to be delivered.

In another example, as shown in FIG. 6, a customer (e.g., operating a consignee computing device 110 or consignor computing device 120) may provide a physical address to which items should be delivered for each day of the week (including holidays) and for certain time periods during those days. Continuing with the above example, pickups from or deliveries to this particular customer on Mondays, Tuesdays, Wednesdays, and Thursdays (a) between 7:00 am-9:00 am and 5:00 pm-9:00 pm should be made at 105 Main Street, Atlanta, Ga. 30309, USA, and (b) between 9:00 am-5:00 pm should be made at 1201 W Peachtree, Atlanta, Ga. 30309, USA. Pickups from or deliveries on Fridays (a) between 7:00 am-9:00 am should be made at 105 Main Street, Atlanta, Ga. 30309, USA, and (b) between 9:00 am-9:00 pm should be made at 71 Lanier Islands, Buford, Ga. 30518, USA. And pickups from or deliveries on Saturdays, Sundays, or national holidays should be made at 71 Lanier Islands, Buford, Ga. 30518, USA. After receiving the input for the automatic service schedule (e.g., provided by a customer operating an appropriate computing device 110/120), the carrier system 100 can update the appropriate customer profile to reflect that items to be picked up from and/or delivered to the customer should be in accordance with the service schedule (e.g., the customer's preferences or requests). As noted, such service schedules may be based on other considerations, factors, criteria, and similar words used herein interchangeably as well, such as months of the year, delivery instructions, delivery service levels, seasons, weather conditions for the pickup or delivery date/time, travel conditions for the pickup or delivery date/time, environmental conditions for the pickup or delivery date/time, safety conditions for the pickup or delivery date/time, and/or the like. Such automatic services schedules can be used to deliver items in accordance with the preferences regardless of the physical address, date, time, and/or the like that were originally intended by the consignor, carrier, or consignee. Such automatic service schedules are also described in U.S. application Ser. No. 14/025,893, which is hereby incorporated in its entirety by reference.

In some embodiments, the consignee schedule information/data may be accessible or inaccessible. In other words, in some embodiments, a customer may have used, for example, a consignee computing device 110 or consignor computing device 120 to provide a physical address to which items should be delivered for each day of the week and/or for certain time periods during those days. Whereas, in some embodiments, a consignee may not have provided such information. In some embodiments, accessible may include any means in which an apparatus may be configured to access or receive data stored in any location in which the apparatus has access, without having to prompt the consignee for such information. In some embodiments, the carrier system 100 may include means for determining/identifying the accessibility of the consignee schedule information/data. In an instance in which the consignee schedule information/data is accessible, the consignee computing device need not be prompted and the process may proceed to step 435.

In an instance in which the consignee schedule information/data is not accessible, the carrier system 100 may be configured to request or query consignee schedule information/data. Accordingly, in some embodiments, the carrier system 100, as is shown in operation 420, may include means for providing, via the network, to the consignee computing device, mobile device or the like, a user interface configured to prompt for the consignee schedule information/data and/or otherwise receive the consignee schedule information/data. For example, the carrier system 100, upon reception of shipping/parcel information/data and determination that the consignee to which the item/parcel must be delivered has not provided preference information/data including locations and corresponding times, such as in the format shown in FIG. 8B, may transmit information/data configured to cause the consignee computing device or mobile device, by way of an associated application or the like, to prompt the user for schedule information/data. The consignee computing device, or application loaded thereon, may be configured to receive user input of dates, time, locations, and the like. As such, in some embodiments, the carrier system 100, as is shown in operation 425, may include means for receiving the consignee schedule information/data. In some embodiments, the carrier system 100, as is shown in operation 430, may include means for storing, via one or more processors, the consignee schedule information/data.

In some embodiments, upon determination and/or identification that the consignee schedule information/data is not accessible, the carrier system 100 may be configured for providing, to a particular application running on a consignee computing device, notification of a new item/parcel, requesting location information/data and duration information, and/or receiving location and duration information. The consignee computing device may be configured for accessing location information/data via location determining aspects such as GPS functionality. In some embodiments, the application (e.g., a location tracking application or GPS tracking application) may have permission and/or functionality to utilize the GPS functionality, thereby providing, upon request, location information/data to the carrier system 100. Duration information/data may be obtained for subsequent provision, by means for prompting the consignee for an expected duration, accessing calendar or clock functionality, or the like.

Referring back to FIG. 4, once the consignee schedule information/data is accessible or has otherwise been received, the carrier system 100 may determine which of one or more delivery services will deliver the item/parcel. For example, in some embodiments, the item/parcel may be delivered by a primary carrier, the primary carrier being a first carrier service. In other embodiments, the primary carrier may contract out the final delivery of the item/parcel. In such embodiments, the primary carrier may be referred to as initial carrier and the carrier contracted for delivery of the item/parcel may be referred to a last mile carrier, the last mile carrier being a second carrier service or last mile carrier delivery service. In some embodiments, where the delivery is handled by the primary carrier, they may be said to be acting as initial carrier and the last mile carrier. Accordingly, in some embodiments, the carrier system 100, as is shown in operation 435, may include means for identifying whether the item will be delivered by a first carrier service (e.g., the primary carrier) or a second carrier service (e.g., a last mile carrier).

In an instance in which the determination yields that the item/parcel will be delivered by the first carrier service (e.g., the primary carrier), the carrier system 100 may be configured to determine when and where the item will be delivered. Accordingly, in some embodiments, the carrier system 100, as is shown in operation 440, may include means for, in an instance in which the determination yields that the item will be delivered by the first carrier service, determining, via one or more processors, the delivery time and the delivery location based on the consignee schedule information/data. In some embodiments, for example, determination between the one or more location-time pairs and the default delivery location and the estimated time of delivery may be determined by, for example, calculating an impact of delivering the item/parcel according to each of the one or more location-time pairs and the default delivery location and the estimated time of delivery. Once the impact of each delivery location and associated delivery time are calculated, the carrier system 100 may be configured for or include means for selecting the least impactful delivery location and delivery time. As will be described below, in some embodiments, one or more factors may be considered in the calculation of the impact of each option and/or determination of the delivery time and the delivery location as well.

In an instance in which the determination yields that the item will be delivered by the second carrier service (e.g., a last mile carrier service), a system associated with the second carrier service (e.g., a last mile carrier system) may determine when and where the item will be delivered. The last mile carrier system may include means for providing, to the carrier system 100, via a network, a delivery location and a delivery time. In some embodiments, the carrier system 100, as is shown in operation 440, may include means for providing the consignee schedule information/data, via a network, to the last mile carrier system, the last mile carrier system configured to determine the delivery location and the delivery time based on the consignee schedule information/data. That is, in some embodiments, once the consignee schedule information/is provided by the carrier system 100 and received by the last mile carrier system—the last mile carrier system may determine a delivery location, a delivery date, and/or a delivery time. Subsequent to the determination of the delivery location and the delivery time, the last mile carrier system may provide the carrier system 100 with the determined delivery location and delivery time. As such, as is shown in operation 450, the carrier system 100 may include means for receiving, via the network, from the last mile carrier system, information/data indicative of the delivery location and the delivery time.

Regardless of whether the first carrier service (e.g., the primary or initial carrier) or the second carrier service (e.g., the last mile carrier) delivers the item/parcel, determination of the delivery location, the delivery day, and/or the delivery time may be based on the consignee schedule information/data and in some embodiments, additional factors. Additional factors may include consignee location, other items/parcels and their associated destinations, traffic analysis, fuel consumption and the like. In some embodiments, in order to determine which location based on a consignee's schedule may be optimal or otherwise provide the best opportunity for delivery, an algorithm may be run based on each of one or more vehicles the package may be placed on and the estimated location of those vehicles at the times accounted for in the consignee's schedule. The carrier system 100 or a shipping/parcel information/data processing system may then be configured to compare each of one or more, or in some embodiments, all of the available routes and select the one with the least impact. In the event that a route cannot be selected, the system may default to the consignee's actual shipping address and deliver based on the standard schedule.

In some embodiments, a determination of which parcel/item service may deliver an item/parcel and/or what day and time an item/parcel may be delivered may be based on one or more of a plurality of factors. That is, an evaluation or determination may include evaluating various considerations, factors, and/or criteria, such as determining/identifying the month of the year for the delivery date/time, determining/identifying the season for the delivery date/time, determining/identifying the expected weather conditions for the delivery date/time, determining/identifying the expected travel conditions for the delivery date/time, determining/identifying the expected environmental conditions for the pickup or delivery date/time, safety conditions for the pickup or delivery date/time, and/or the like. Such determinations/evaluations/identifications can then be used to determine how the item should be processed, handled, routed, and/or delivered in accordance with, for example, the consignee's automatic service schedule.

Moreover, independent whether the first carrier service (e.g., the primary or initial carrier) or the second carrier service (e.g., the last mile carrier) may deliver the item/parcel, the delivery location, the delivery day and the delivery time may be provided by the carrier system to the consignee computing device. Accordingly, in some embodiments, the carrier system 100, as is shown in operation 455, may include means for providing, to a consignee computing device, via a network, a delivery location and a delivery time, the delivery location and the delivery time.

Figures 8A, 8B:
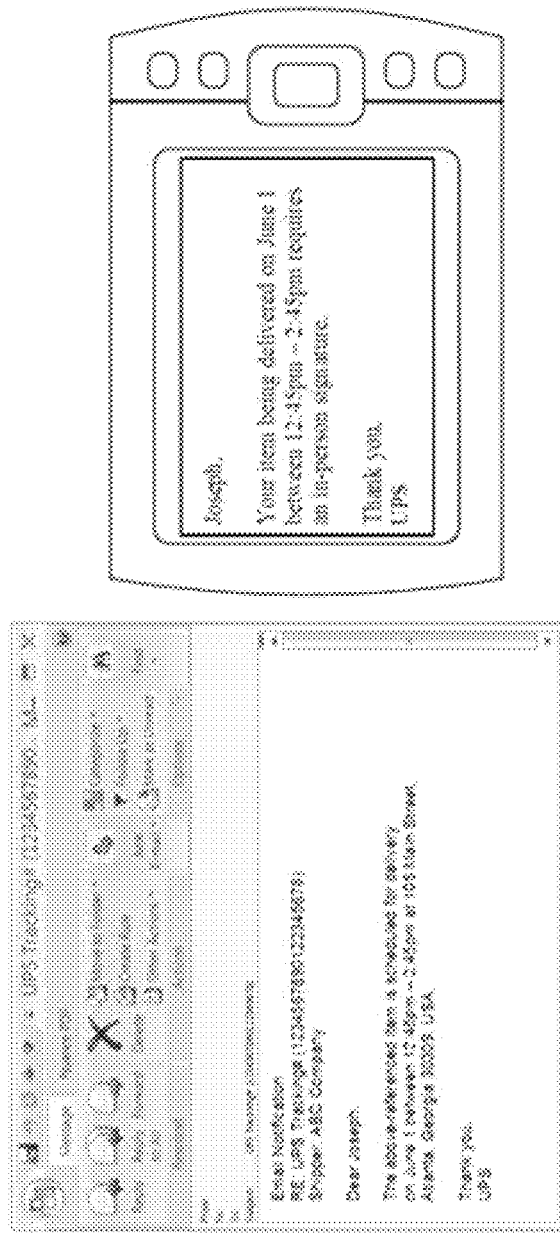
FIGS. 8A and 8B show exemplary input and output of various embodiments of the present invention.

In one embodiment, consignee's (e.g., operating customer computing devices) can customize and/or provide communication preferences regarding items to be picked up from or delivered to the customers. For example, the communication preferences may provide consignees with the ability to request messages for items before the carrier attempts to deliver items (e.g., prior to the first carrier attempt by the carrier). FIG. 7 is a flowchart illustrating operations and processes that may be performed for providing notification, to a customer computing device, of a delivery location, a delivery time, and a delivery day based on communication preferences of the consignee. For example, consignees may specify in their communication preference how and when to be contacted, such as by email the morning of the scheduled delivery. The messages may indicate the delivery location, delivery date and/or delivery time, such as shown in FIGS. 8A and 8B, and a variety of other information. As will be recognized, a variety of other operations and processes may be used with embodiments of the present invention. These operations and processes can be customized to adapt to various needs and circumstances.

Referring back to FIG. 7, as is shown in operation 705, an apparatus, such as the last mile carrier system or carrier system 100, may include means, such as the processor 205 or the like, for storing communication preferences for providing information/data indicative of the delivery location and the delivery time, wherein the communication preferences (1) identify at least one communication format and at least one corresponding electronic destination address to be used in providing the information/data to the customer, and (2) define a time period prior to a first carrier attempt of the item in which a message providing the information/data is to be transmitted to the at least one corresponding electronic destination address. In some embodiments, the at least one communication format is selected from the group consisting of a text message, an email message, a voice message, a picture message, a video message, and a social media message.

As is shown in operation 710, an apparatus, such as the last mile carrier system or carrier system 100, may include means, such as the processor 205 or the like, for automatically generating a message providing the information/data regarding the item to be delivered to the customer. As is shown in operation 715, an apparatus, such as the last mile carrier system or carrier system 100, may include means, such as the processor 205 or the like, for automatically transmitting the message to the at least one corresponding electronic destination address within the defined time period prior to the first carrier attempt of the item to the customer. FIGS. 8A and 8B show exemplary user interfaces providing the delivery location and the delivery time in accordance with some embodiments. In some embodiments, the carrier system 100 may automatically generate (e.g., via the message module 260) one or more messages providing information/data regarding an item to be delivered to the customer, for example, in compliance with the consignee's communication preferences. Similarly, the carrier system 100 may automatically transmit the one or messages to the electronic destination addresses in compliance with the consignee's communication preferences. For example, the carrier system 100 may generate and transmit an email message to a consignee email address and a text message to a consignee's cellular phone the day before an item is to be delivered to the consignee's home address.

2. Exemplary Embodiments

Figure 9:
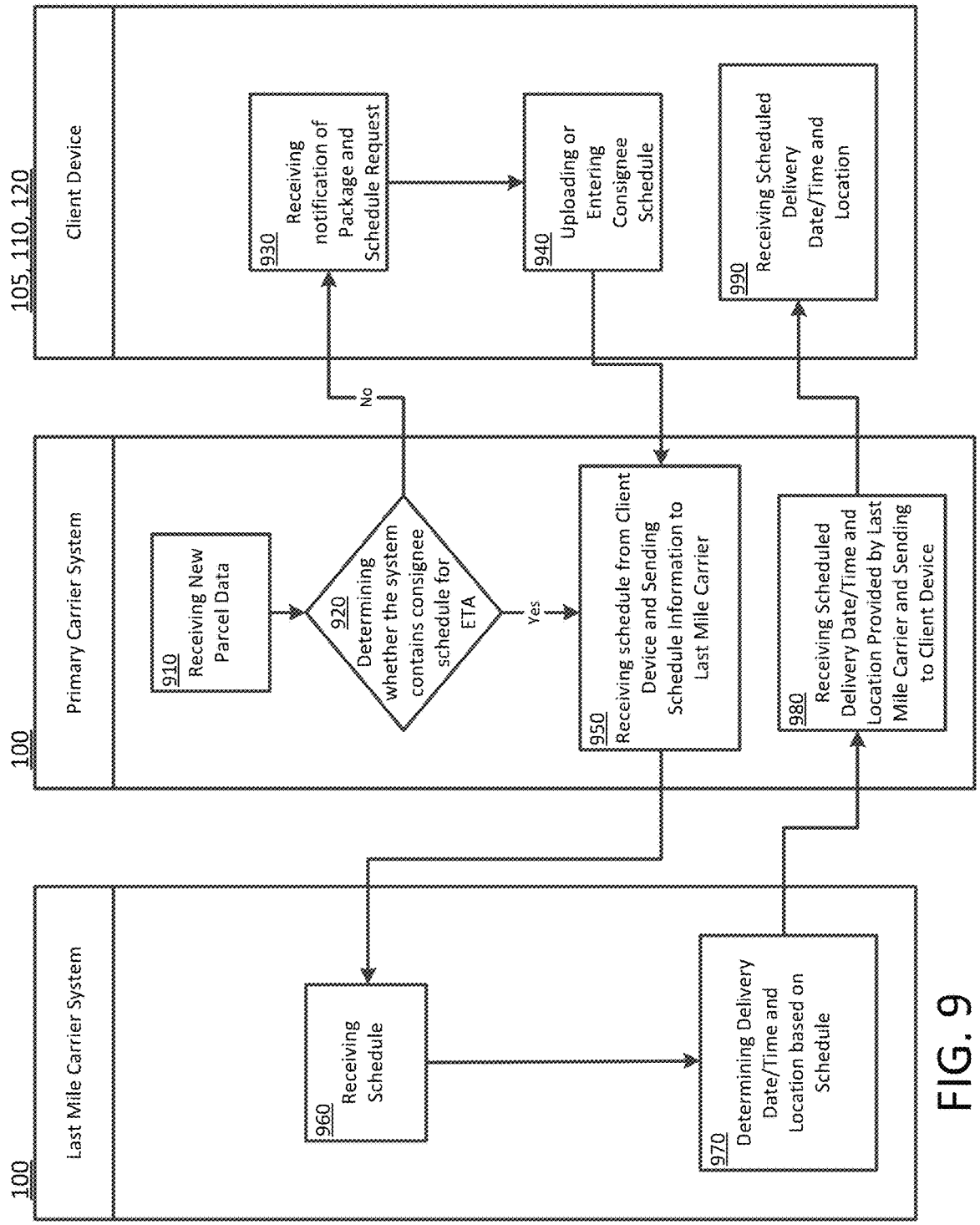
FIGS. 9-15 show data flow diagrams, each illustrating an exemplary embodiment of the present invention.

In some exemplary embodiments, the process shown in FIG. 4 may be performed by a last mile carrier system, such as that shown in FIG. 9. Accordingly, FIG. 9 shows a data flow diagram that may be performed by a system 900 for providing a consignee with information/data indicative of when and where an item will be delivered. The system 900 may include a first carrier system (e.g., the last mile carrier system), which may be embodied by carrier system 100 shown in FIG. 2, a client device embodied by, for example, consignee computing device 110 shown in FIG. 3, and a second last mile carrier system, (e.g., shown here as the "last mile carrier system"), which may be embodied by a second instance of carrier system 100 shown in FIG. 2.

In some embodiments, as is shown in operation 910, an apparatus, such as the last mile carrier system or carrier system 100, may include means, such as the processor 205 or the like, for receiving new shipping/parcel information/data, the new shipping/parcel information/data indicative of an item or parcel/item awaiting delivery to the consignee. In some embodiments, as is shown in operation 920, an apparatus, such as the last mile carrier system or carrier system 100, may include means, such as the processor 205 or the like, for determining/identifying whether the consignee schedule information/data is stored in the system or otherwise accessible. Otherwise accessible may include any means in which the apparatus may be configured to access or receive data stored in any location in which the apparatus has access, without having to prompt the consignee for such information.

As is shown in operation 930, an apparatus, such as one or more mobile stations 105, one or more consignee computing devices 110, may include means, such as the processing device 308 or the like, for receiving a notification indicative of an item/parcel awaiting delivery and a schedule request. In some embodiments, as is shown in operation 940, an apparatus, such as the client device embodied by, for example, consignee computing device 110 shown in FIG. 3, may include means, such as the processing device 308 or the like, for uploading, entering or otherwise providing consignee schedule information/data.

Once the consignee, by way of the client device uploads or enters the consignee schedule information/data, it may be sent to the carrier system. As such, in some embodiments, as is shown in operation 950, an apparatus, such as the last mile carrier system or carrier system 100, may include means, such as the processor 205 or the like, for receiving the consignee schedule information/data and/or providing the consignee schedule information/data to a last mile carrier system. In some embodiments, as is shown in operation 960, an apparatus, such as the last mile last mile carrier system or a second instance of carrier system 100, may include means, such as the processor 205 or the like, for receiving the consignee schedule information/data.

In some embodiments, as is shown in operation 970, an apparatus, such as the last mile last mile carrier system or a second instance of carrier system 100, may include means, such as the processor 205 or the like, for determining/identifying a delivery data, a delivery time, and a delivery location. The determination of the delivery data, the delivery time, and the delivery location may be based on the consignee schedule information/data and, as discussed above, in some embodiments, on additional factors. Subsequently, as is shown in operation 980, an apparatus, such as the last mile carrier system or carrier system 100, may include means, such as the processor 205 or the like, for receiving the delivery date, the delivery time, and the delivery location and/or providing the delivery date, the delivery time, and the delivery location to a client device. As is shown in operation 990, an apparatus, such as a client device embodied by, for example, consignee computing device 110, may include means, such as the processing device 308 or the like, for then receiving the delivery date, the delivery time, and the delivery location.

Figure 10:
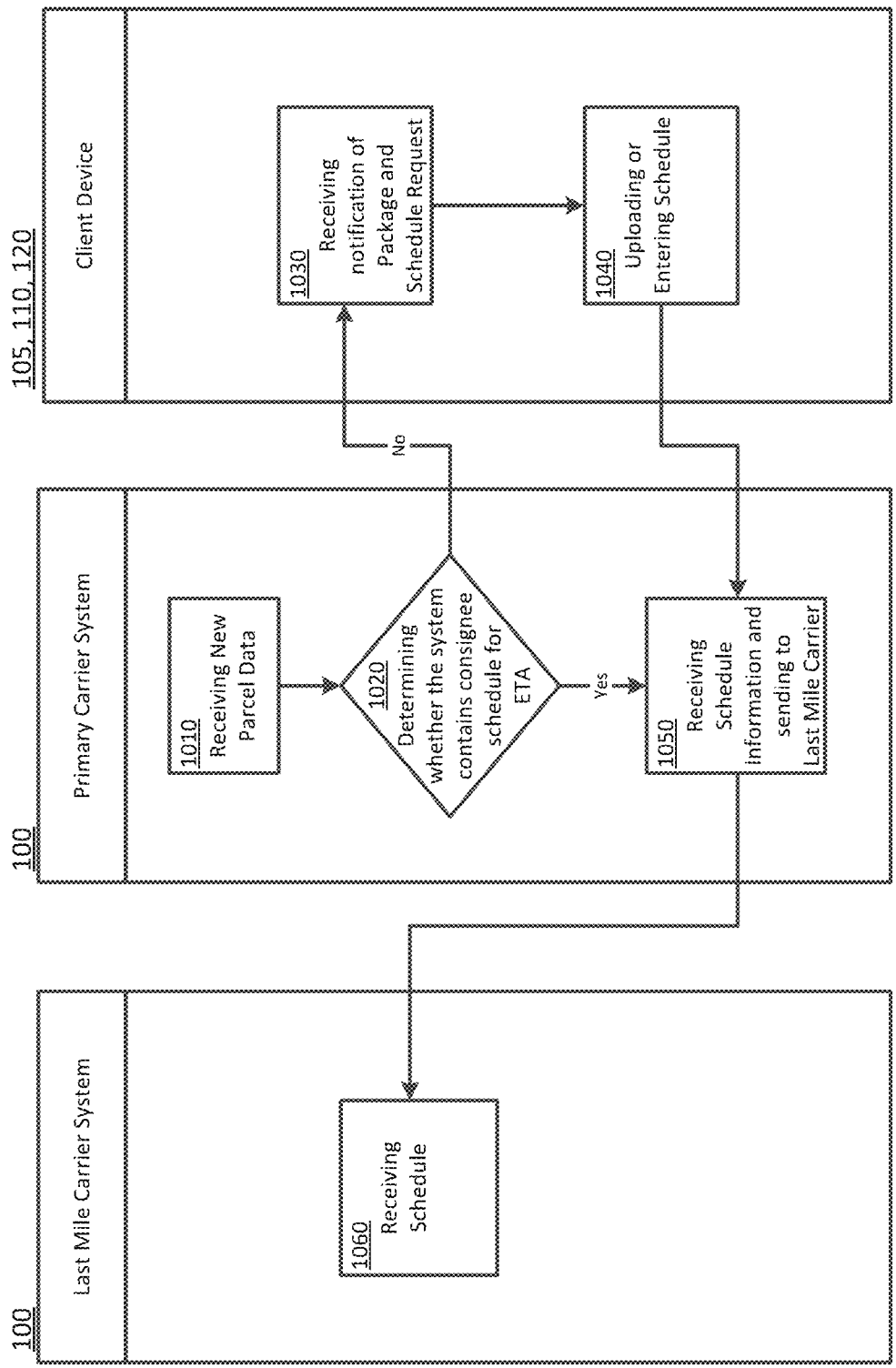

FIG. 10 shows a data flow diagram that may be performed by a system for providing a consignee with information/data indicative of when and where an item will be delivered. Accordingly, FIG. 10 shows a data flow diagram that may be performed by a system 1000 for providing a consignee with information/data indicative of when and where an item will be delivered. The system 1000 may include a first carrier system (e.g., the last mile carrier system), which may be embodied by carrier system 100 shown in FIG. 2, a client device embodied by, for example, consignee computing device 110 shown in FIG. 3, and a second last mile carrier system, (e.g., shown here as the "Last Mile Last mile carrier system"), which may be embodied by a second instance of carrier system 100 shown in FIG. 2.

In some embodiments, as is shown in operation 1010, an apparatus, such as the last mile carrier system or carrier system 100, may include means, such as the processor 205 or the like, for receiving new shipping/parcel information/data, the new shipping/parcel information/data indicative of an item awaiting delivery to the consignee.

In some embodiments, as is shown in operation 1020, an apparatus, such as the last mile carrier system or carrier system 100, may include means, such as the processor 205 or the like, for determining/identifying whether the consignee schedule information/data is stored in the system or otherwise accessible. Otherwise accessible may include any means in which the apparatus may be configured to access or receive data stored in any location in which the apparatus has access, without having to prompt the consignee for such information.

In some embodiments, as is shown in operation 1030, an apparatus, such as the client device embodied by, for example, consignee computing device 110, may include means, such as the processing device 308 or the like, for receiving a notification indicative of an item/parcel awaiting delivery and a schedule request. In some embodiments, as is shown in operation 1040, an apparatus, such as the client device embodied by, for example, consignee computing device 110, may include means, such as the processing device 308 or the like, for uploading, entering or otherwise providing consignee schedule information/data.

In some embodiments, as is shown in operation 1050, an apparatus, such as the last mile carrier system or carrier system 100, may include means, such as the processor 205 or the like, for receiving the consignee schedule information/data and/or providing the consignee schedule information/data to a last mile carrier system. In some embodiments, as is shown in operation 1060, an apparatus, such as the last mile last mile carrier system or a second instance of carrier system 100, may include means, such as the processor 205 or the like, for receiving the consignee schedule information/data.

Figure 11:
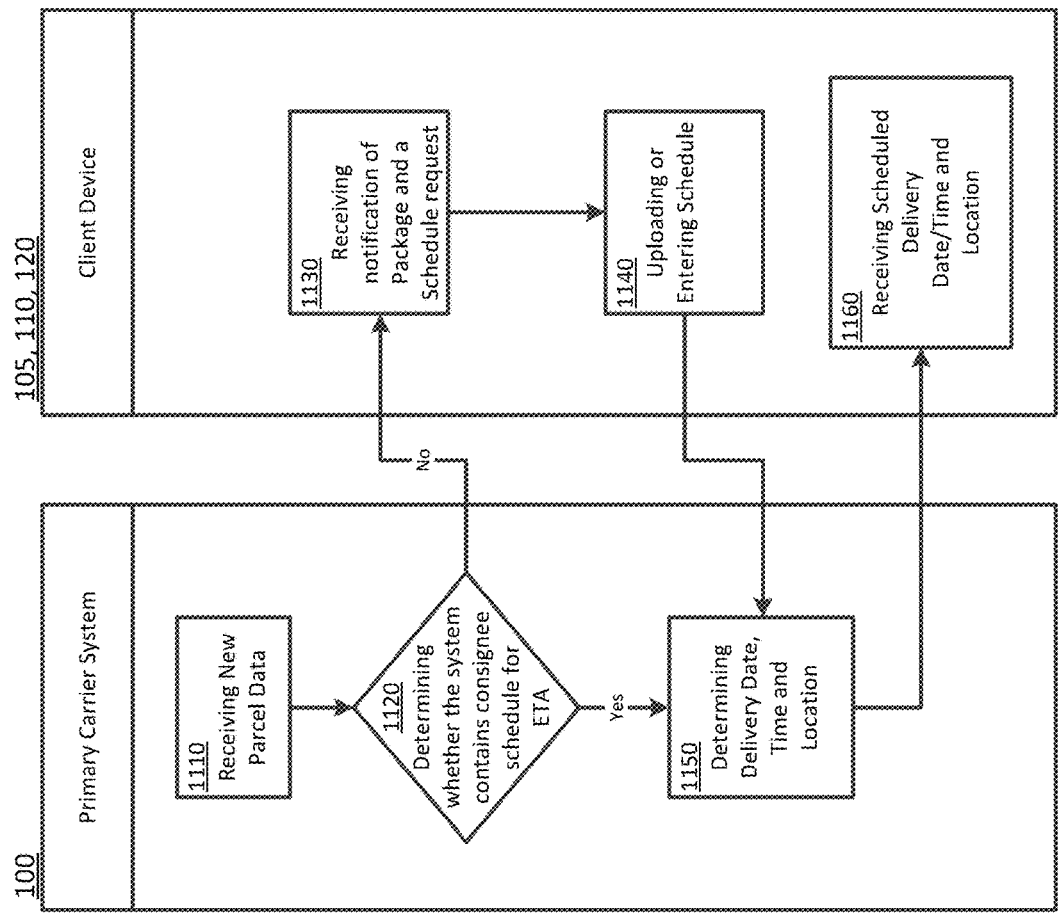

FIG. 11 shows a data flow diagram. The system 1100 may include a carrier system (e.g., the last mile carrier system) and a client device embodied by, for example, consignee computing device 110 shown in FIG. 3. In some embodiments, as is shown in operation 1110, an apparatus, such as the last mile carrier system or carrier system 100, may include means, such as the processor 205 or the like, for receiving new shipping/parcel information/data, the new shipping/parcel information/data indicative of an item awaiting delivery to the consignee.

In some embodiments, as is shown in operation 1120, an apparatus, such as the last mile carrier system or carrier system 100, may include means, such as the processor 205 or the like, for determining/identifying whether the consignee schedule information/data is stored in the system or otherwise accessible. Otherwise accessible may include any means in which the apparatus may be configured to access or receive data stored in any location in which the apparatus has access, without having to prompt the consignee for such information.

In some embodiments, as is shown in operation 1130, an apparatus, such as a client device embodied by, for example, consignee computing device 110, may include means, such as the processing device 308 or the like, for receiving a notification indicative of an item/parcel awaiting delivery and a schedule request. In some embodiments, as is shown in operation 1140, an apparatus, such as the client device embodied by, for example, consignee computing device 110, may include means, such as the processing device 308 or the like, for uploading, entering or otherwise providing consignee schedule information/data.

In some embodiments, as is shown in operation 1150, an apparatus, such as the last mile carrier system or carrier system 100, may include means, such as the processor 205 or the like, for determining/identifying a delivery date, a delivery time, and a delivery location. In some embodiments, as is shown in operation 1160, an apparatus, such as the client device embodied by, for example, consignee computing device 110, may include means, such as the processing device 308 or the like, for receiving the delivery date, the delivery time, and the delivery location.

Figure 12:
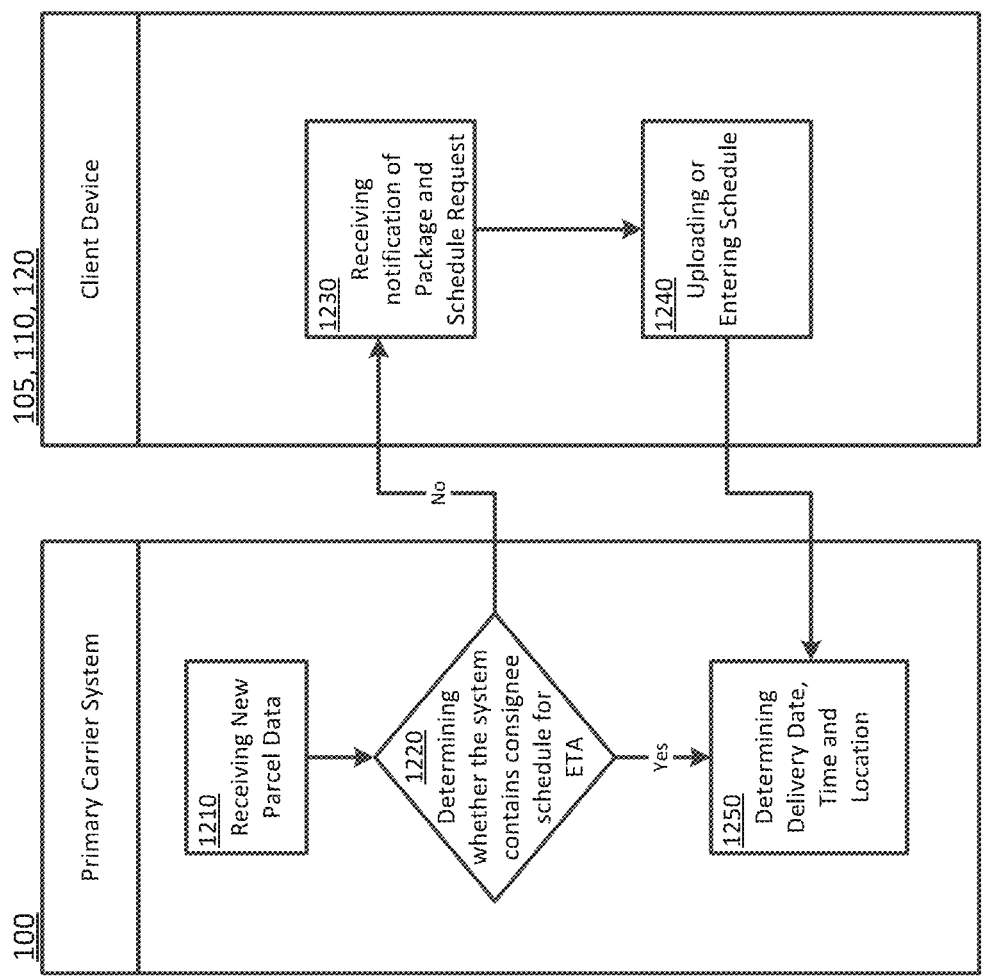

FIG. 12 shows a data flow diagram. The system 1200 may include a carrier system (e.g., the last mile carrier system) and a client device embodied by, for example, consignee computing device 110 shown in FIG. 3. In some embodiments, as is shown in operation 1210, an apparatus, such as the last mile carrier system or carrier system 100, may include means, such as the processor 205 or the like, for receiving new shipping/parcel information/data, the new shipping/parcel information/data indicative of an item awaiting delivery to the consignee.

In some embodiments, as is shown in operation 1220, an apparatus, such as the last mile carrier system or carrier system 100, may include means, such as the processor 205 or the like, for determining/identifying whether the consignee schedule information/data is stored in the system or otherwise accessible. Otherwise accessible may include any means in which the apparatus may be configured to access or receive data stored in any location in which the apparatus has access, without having to prompt the consignee for such information.

In some embodiments, as is shown in operation 1230, an apparatus, such as the client device embodied by, for example, consignee computing device 110, may include means, such as the processing device 308 or the like, for receiving a notification indicative of an item/parcel awaiting delivery and a schedule request. In some embodiments, as is shown in operation 1240, an apparatus, such as the client device embodied by, for example, consignee computing device 110, may include means, such as the processing device 308 or the like, for uploading, entering or otherwise providing consignee schedule information/data.

In some embodiments, as is shown in operation 1250, an apparatus, such as the last mile carrier system or carrier system 100, may include means, such as the processor 205 or the like, for determining/identifying a delivery data, a delivery time, and a delivery location.

Figure 13:
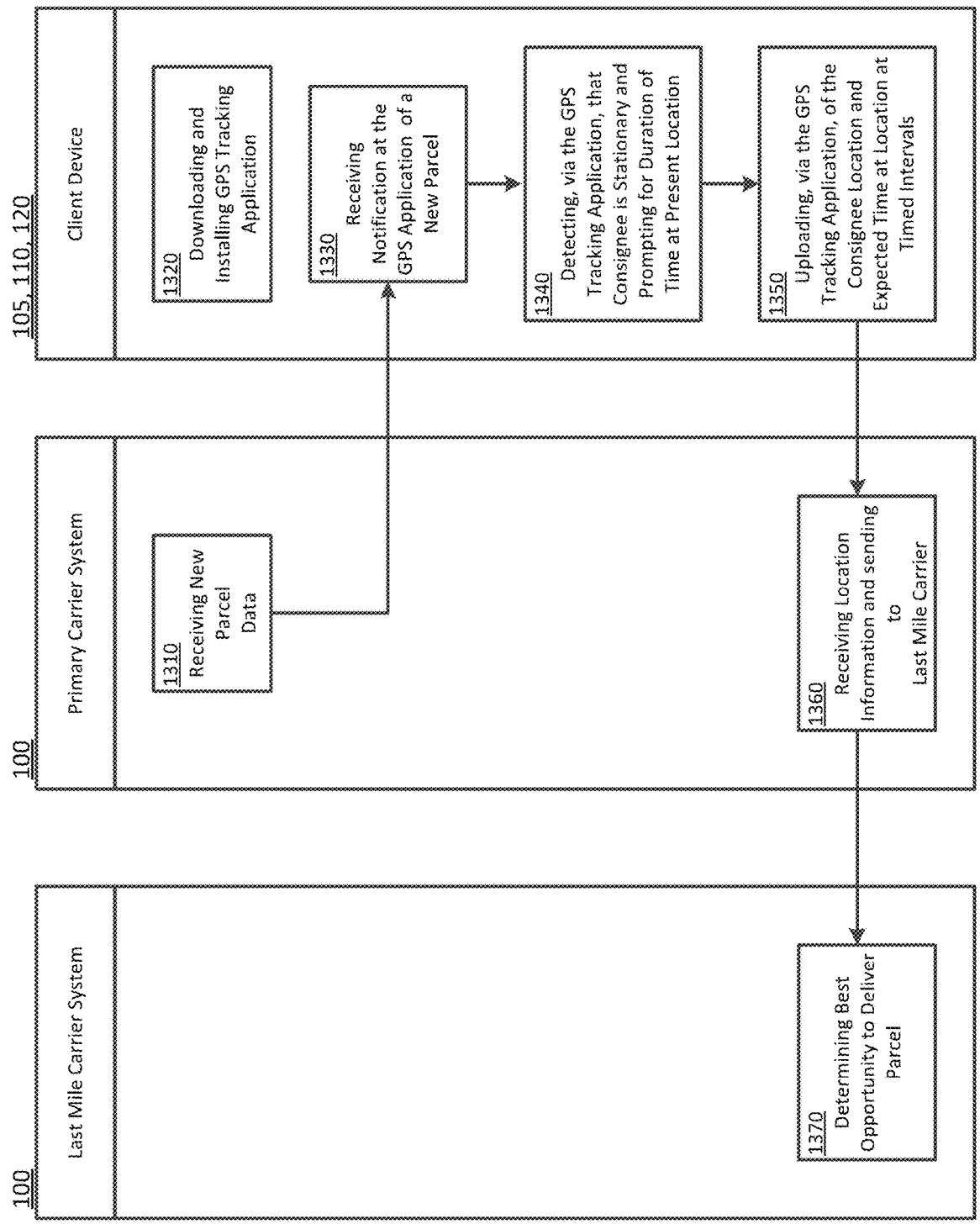

FIG. 13 shows a data flow diagram that may be performed by a system 1300 for providing a consignee with information/data indicative of when and where an item will be delivered. The system 1300 may include a first carrier system (e.g., the last mile carrier system), which may be embodied by carrier system 100 shown in FIG. 2, a client device embodied by, for example, consignee computing device 110 shown in FIG. 3, and a second last mile carrier system, (e.g., shown here as the "Last Mile Last mile carrier system"), which may be embodied by a second instance of carrier system 100 shown in FIG. 2.

In some embodiments, as is shown in operation 1310, an apparatus, such as the last mile carrier system or carrier system 100, may include means, such as the processor 205 or the like, for receiving new shipping/parcel information/data, the new shipping/parcel information/data indicative of an item awaiting delivery to the consignee. The apparatus may additionally include means for, as described above, determining whether consignee schedule information/data is accessible and, in an instance in which the consignee schedule information/data is not accessible, providing, via the network, a user interface configured to prompt for and receive the consignee schedule information. Additionally or alternatively, the apparatus may include means for providing, to a particular application on a consignee computing device 110, notification of the item/parcel, and/or a request for location information/data and duration information.

In some embodiments, as is shown in operation 1320, an apparatus, such as the client device embodied by, for example, consignee computing device 110, may include means, such as the processing device 308 or the like, for downloading and/or installing a location tracking application (e.g., location determining aspects such as a GPS tracking application). In some embodiments, as is shown in operation 1330, an apparatus, such as the client device embodied by, for example, consignee computing device 110, may include means, such as the processing device 308 or the like, for receiving notification, via the GPS tracking application, of a new item/parcel, the new parcel/item awaiting delivery to the consignee. In some embodiments, the notification may include a query to the location tracking application or a prompt for consignee schedule information. In some embodiments, the query or prompt may only request a portion of the consignee schedule information, such as the current location and how long the consignee has been in that location and/or how long the consignee intends to be at the location. In some embodiments, as is shown in operation 1340, an apparatus, such as the client device embodied by, for example, consignee computing device 110, may include means, such as the processing device 308 or the like, for detecting, via the GPS tracking application, that the consignee is stationary or near stationary and prompting, via a user interface functionality of the GPS tracking application, for an expected duration of time in which the consignee expects to be at the present location.

In some embodiments, as is shown in operation 1350, an apparatus, such as the client device embodied by, for example, consignee computing device 110, may include means, such as the processing device 308 or the like, for uploading, via the GPS tracking application or the like, the consignee location and an expected time at the location. In some embodiments, the consignee location and/or the expected time at the location are uploaded or otherwise updated at timed intervals. In some embodiments, as is shown in operation 1360, an apparatus, such as the last mile carrier system or carrier system 100, may include means, such as the processor 205 or the like, for receiving location information/data and sending the location information/data to the last mile carrier system (e.g., the last mile last mile carrier system). In some embodiments, as is shown in operation 1370, an apparatus, such as the last mile last mile carrier system or a second instance of carrier system 100, may include means, such as the processor 205 or the like, for determining/identifying the best opportunity to deliver the item/parcel.

Figure 14:
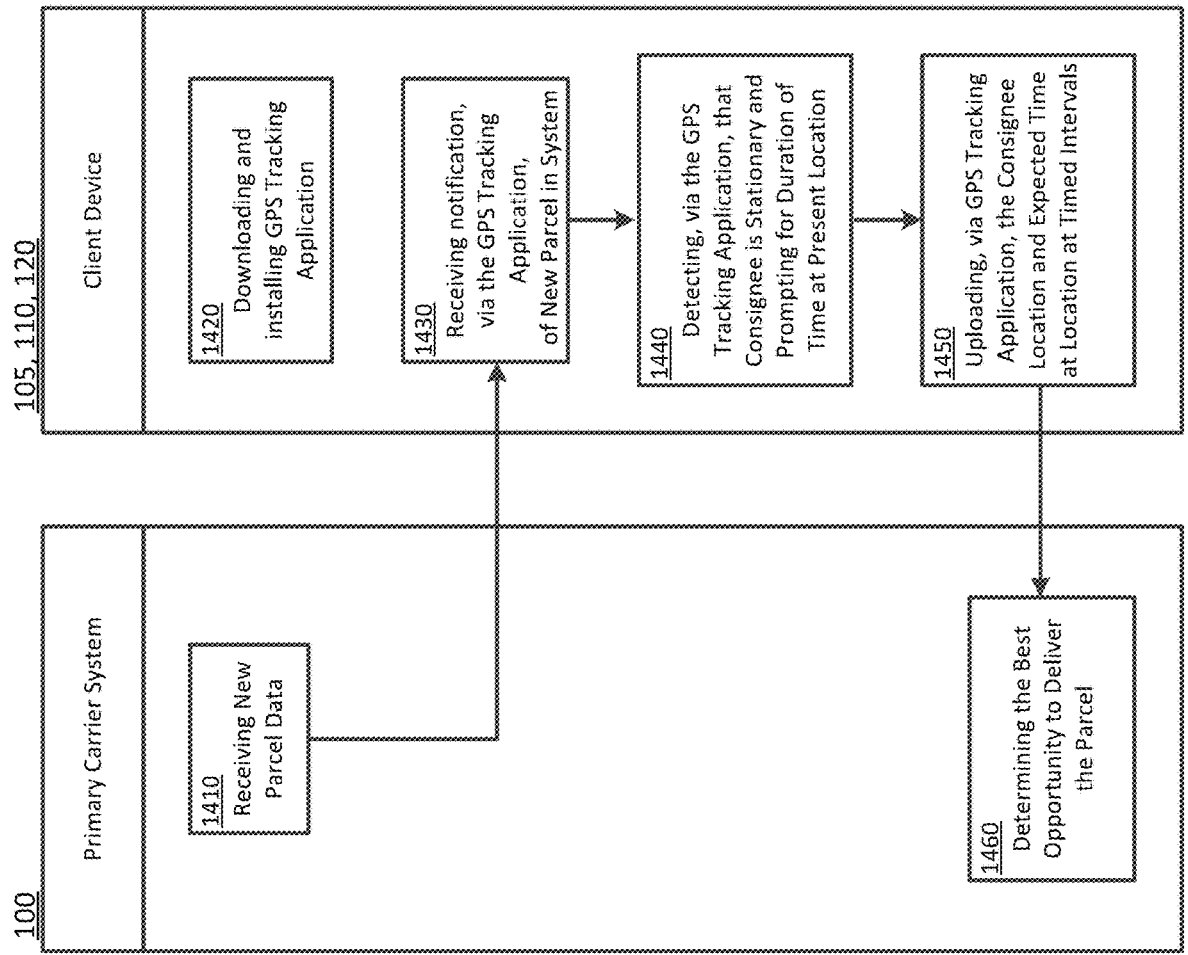

FIG. 14 shows a data flow diagram similar to FIG. 13. The system 3200 may include a carrier system (e.g., the last mile carrier system) and a client device embodied by, for example, consignee computing device 110 shown in FIG. 3. In some embodiments, as is shown in operation 1410, an apparatus, such as the last mile carrier system or carrier system 100, may include means, such as the processor 205 or the like, for receiving new shipping/parcel information/data, the new shipping/parcel information/data indicative of an item awaiting delivery to the consignee.

In some embodiments, as is shown in operation 1420, an apparatus, such as the client device embodied by, for example, consignee computing device 110, may include means, such as the processing device 308 or the like, for downloading and/or installing a location tracking application (e.g., a GPS tracking application). In some embodiments, as is shown in operation 1430, an apparatus, such as the client device embodied by, for example, consignee computing device 110, may include means, such as the processing device 308 or the like, for receiving notification, via the GPS tracking application, of a new item/parcel, the new parcel/item awaiting delivery to the consignee. In some embodiments, the notification may include a query to the location tracking application or a prompt for consignee schedule information. In some embodiments, the query or prompt may only request a portion of the consignee schedule information, such as the current location and how long the consignee has been in that location and/or how long the consignee intends to be at the location. In some embodiments, as is shown in operation 1440, an apparatus, such as the client device embodied by, for example, consignee computing device 110, may include means, such as the processing device 308 or the like, for detecting, via the GPS tracking application, that the consignee is stationary or near stationary and prompting, via a user interface functionality of the GPS tracking application, for an expected duration of time in which the consignee expects to be at the present location (e.g., 5 minutes, 10 minutes, 30 minutes, 60 minutes).

In some embodiments, as is shown in operation 1450, an apparatus, such as the client device embodied by, for example, consignee computing device 110, may include means, such as the processing device 308 or the like, for uploading, via the GPS tracking application, the consignee location and an expected time at the location. In some embodiments, the consignee location and/or the expected time at the location are uploaded or otherwise updated at timed intervals. In some embodiments, as is shown in operation 1460, an apparatus, such as the last mile carrier system or carrier system 100, may include means, such as the processor 205 or the like, for determining/identifying the best opportunity to deliver the item/parcel.

Figure 15:
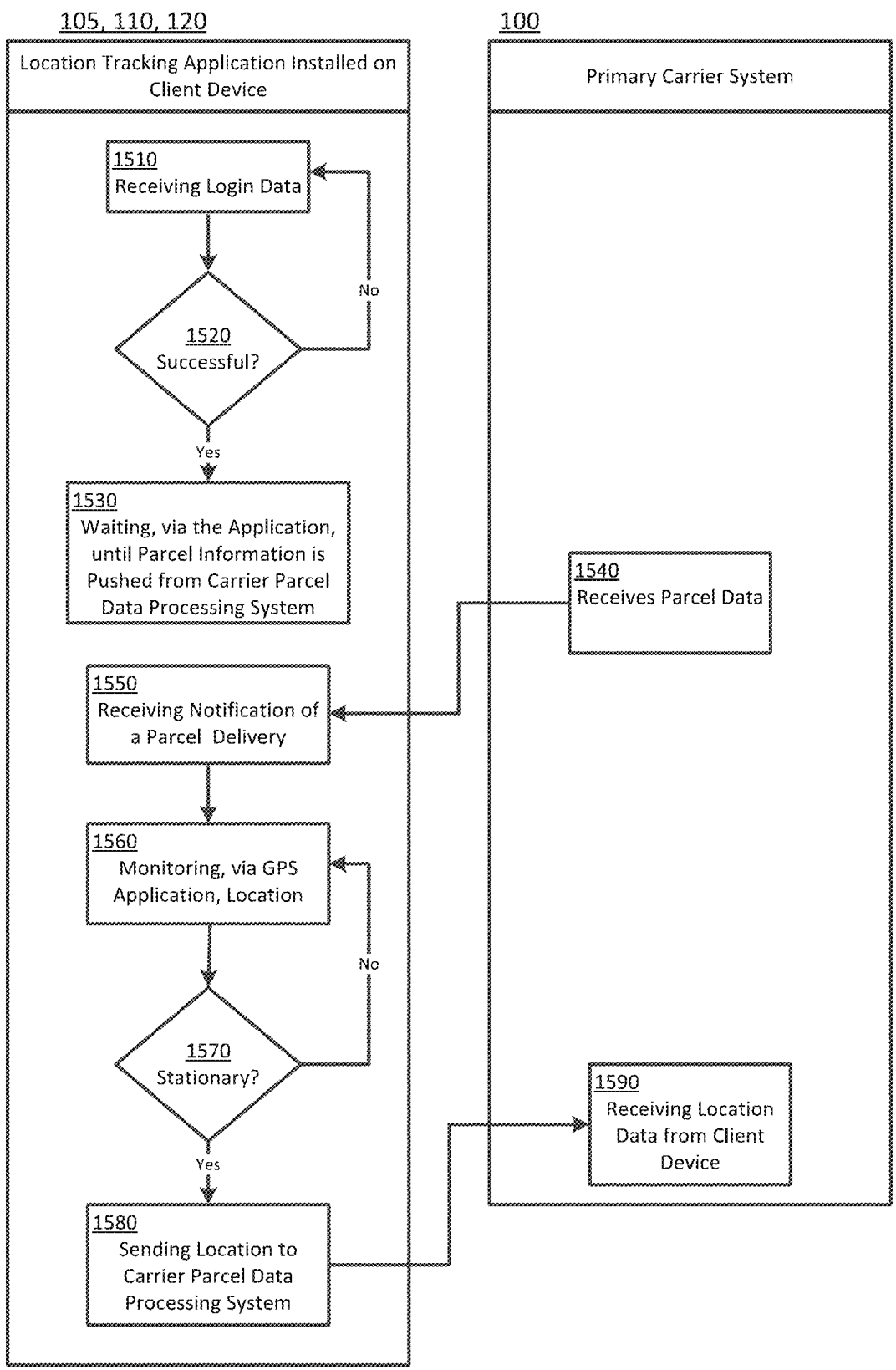

FIG. 15 shows a data flow diagram. The system 1500 may include a carrier system (e.g., the last mile carrier system) and a client device embodied by, for example, consignee computing device 110 shown in FIG. 3. In some embodiments, as is shown in operation 1510, an apparatus, such as the client device embodied by, for example, consignee computing device 110, may include means, such as the processing device 308 or the like, for performing a login process or otherwise receiving log in information. For example, the client device may be configured to display a GUI prompting for a username and/or password and may be further configured to receiving the same.

In some embodiments, as is shown in operation 1520, an apparatus, such as the client device embodied by, for example, consignee computing device 110, may include means, such as the processing device 308 or the like, for determining/identifying if the login was successful. If the login was not successful, the process proceeds back to operation 1510 where a subsequent login may be attempted. If the login is successful, the process proceeds to step 1540, where the apparatus may be configured to determine whether or wait for an item/parcel notification.

In some embodiments, as is shown in operation 1530, an apparatus, such as the client device embodied by, for example, consignee computing device 110, may include means, such as the processing device 308 or the like, for waiting, via the application or the like, until parcel/item information/data is pushed from the last mile carrier system. In some embodiments, as is shown in operation 1540, an apparatus, such as the last mile carrier system or carrier system 100, may include means, such as the processor 205 or the like, for receiving shipping/parcel information/data and/or sending the a notification of the pending parcel/item delivery to the client device.

In some embodiments, as is shown in operation 1550, an apparatus, such as the client device embodied by, for example, consignee computing device 110, may include means, such as the processing device 308 or the like, for receiving notification of a pending parcel/item delivery. In some embodiments, as is shown in operation 1560, an apparatus, such as the client device embodied by, for example, consignee computing device 110, may include means, such as the processing device 308 or the like, for monitoring, via the GPS application or the like, the location of the client device. For example, while a consignee may be traveling (e.g., to or from work or the like), the GPS application may continue monitoring the position of the consignee waiting for the consignee, for example, to arrive home, at work, or the like.

Once the GPS application has determined that the consignee has stopped traveling and become stationary, the location at which the consignee stopped and at which the consignee computing device 110 now is located may be transmitted. As such, as is shown in operation 1570, an apparatus, such as the client device embodied by, for example, consignee computing device 110, may include means, such as the processing device 308 or the like, for determining/identifying whether the client device has been stationary or near stationary for a predetermined period of time (e.g., 5 minutes, 10 minutes, 30 minutes, 60 minutes). Subsequently, as is shown in operation 1580, an apparatus, such as the client device embodied by, for example, consignee computing device 110, may include means, such as the processing device 308 or the like, for sending location data, for example, indicative of the current location, to last mile carrier system.

The last mile carrier system now receives the location data. That is, in operation 1590, an apparatus, such as the last mile carrier system or carrier system 100, may include means, such as the processor 205 or the like, for receiving location data from client device. Once the last mile carrier system receives the data, a delivery location and delivery time may be determined. For example, in some embodiments, such as that described with reference to FIG. 13, the last mile carrier system may identify the best opportunity to deliver the item/parcel. As such, an apparatus, such as the last mile last mile carrier system or a second instance of carrier system 100, may include means, such as the processor 205 or the like, for determining/identifying the best opportunity to deliver the item/parcel. The best opportunity, as described earlier, may be, in some embodiments, determined based on comparing each of one or more available routes and selecting the one with the least impact. In the event that no route is available or a route cannot be selected, the last mile carrier system may default to the consignee's actual shipping address and deliver based on the standard schedule.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing information identifying where and when delivery of an item is to occur, the method comprising:
   receiving, by a carrier computing system over a communications network, shipping information for an original item, the shipping information input at a client device indicating the original item to be delivered to a consignee by a carrier and comprising at least an original default delivery location, and original estimated time of delivery;
   in response to the receiving of the shipping information, determining, by the carrier computing system, that at least a first location-time pair of consignee schedule information is not accessible, the consignee schedule information comprising information indicating the consignee and information indicating one or more location-time pairs, each location-time pair indicating a location and an associated time at which the consignee has indicated an ability to receive an item;
   in response to the determining that the first location-time pair of the consignee schedule information is not accessible:
   querying, by the carrier computing system and over the communications network, a location tracking application on a consignee device associated with the consignee and receiving, over the communications network, a GPS location of the consignee device indicative of where the consignee is located;
   in response to the receiving of the GPS location of the consignee device, providing a user interface to the consignee device enabled for causing display of a prompt, via the user interface, and requesting input of the first location-time pair of the consignee schedule information that was not accessible;
   based at least on traffic analysis, determining, by comparing the original estimated time of delivery with the time at which the consignee has indicated an ability to receive the item and further comparing the original default delivery location with the location of the location-time pair, an impact for delivering the original item to the original default delivery location and the location of the first location-time pair; and
   based on the determining of the impact for delivering the original item to the original default delivery location and the location of the first location-time pair, determining a delivery location and a delivery time indicative of where and when delivery of the original item will be made to the consignee by selecting which one of the original default delivery location and the location of the location-time pair is least impactful.

2. The method according to claim 1, further comprising:
   providing, via the communications network, to the client device, the user interface configured to prompt for and receive consignee schedule information; and
   receiving the consignee schedule information.

3. The method according to claim 1, further comprising:
providing, to a particular application on the client device, notification of the original item, and a request for location information and duration information; and
receiving the location and duration information.

4. The method according to claim 1, further comprising:
determining whether the original item will be delivered by a first carrier service or a second carrier service.

5. The method according to claim 4, further comprising:
in response to determining that the original item will be delivered by the first carrier service instead of the second carrier service, determining, via one or more processors, the delivery time and the delivery location by: (1) calculating an impact of delivery to each location at the associated time considering, for each of one or more vehicles available to deliver the original item: (i) other parcels on the one or more vehicles and their associated destinations, (ii) traffic analysis, and (iii) fuel consumption; (2) selecting the least impactful delivery location and delivery time.

6. The method according to claim 4, further comprising:
in response to determining that the original item will be delivered by the second carrier service instead of the first carrier service, providing consignee schedule information, via a network, to a second carrier system, the second carrier system associated with the second carrier service, the second carrier system configured to determine the delivery location and the delivery time based on the consignee schedule information; and
receiving, via the network, from the second carrier system, information indicative of the delivery location and the delivery time.

7. The method according to claim 1, further comprising:
storing communication preferences for providing information indicative of the delivery location and the delivery time, wherein the communication preferences (1) identify at least one communication format and at least one corresponding electronic destination address to be used in providing the information to the consignee, and (2) define a time period prior to a first carrier attempt of the original item in which a message providing the information is to be transmitted to the at least one corresponding electronic destination address;
automatically generating the message providing the information regarding the original item to be delivered to the consignee; and
automatically transmitting the message to the at least one corresponding electronic destination address within the defined time period prior to the first carrier attempt of the original item to the consignee.

8. The method of claim 7, wherein the at least one communication format is selected from the group consisting of a text message, an email message, a voice message, a picture message, a video message, and a social media message.

9. A computer program product comprising at least one non-transitory computer-readable storage medium having computer-readable program code portions stored therein, the computer-readable program code portions comprising instructions for:
receiving shipping information for an item, the shipping information, input at a client device, indicating the item to be delivered to a consignee by a carrier and comprising at least a default delivery location and estimated time of delivery;
determining that a first set of consignee schedule information is accessible, the first set of consignee schedule information comprising information indicating the consignee and information indicating a first set of location-time pairs, each location-time pair indicating a location and an associated time at which the consignee has indicated an ability to receive an item;
querying a location tracking application on a consignee device associated with the consignee and receiving a GPS location of the consignee device, providing a user interface enabled for causing display of a prompt, via the user interface, requesting input of a second location-time pair associated with the GPS location;
based at least on traffic analysis, calculating an impact of delivering the item to: the default delivery location, the first set of location-time pairs, and the second location-time pair;
comparing each impact for delivering the item to the default delivery location, the first set of location-time pairs, and the second location-time pair; and
based at least in part on the comparing of each impact for delivering the item to the default delivery location, the first set of location-time pairs, and the second location-time pair, determining a delivery location and a delivery time indicative of where and when delivery will be made to the consignee a delivery location and a delivery time.

10. The computer program product according to claim 9, wherein the computer-executable program code instructions further comprise program code instructions for:
in an instance in which a second set of consignee schedule information is not accessible, providing to the client device, the user interface configured to prompt for and receive the consignee schedule information; and
receiving the consignee schedule information.

11. The computer program product according to claim 9, wherein the computer-executable program code instructions further comprise program code instructions for:
in an instance of a second set of consignee schedule information not being accessible, providing, to a particular application on the client device, notification of the item, and a request for location information and duration information; and
receiving the location and duration information.

12. The computer program product according to claim 11, wherein the computer-executable program code instructions further comprise program code instructions for:
determining whether the item will be delivered by a first carrier service or a second carrier service.

13. The computer program product according to claim 12, wherein the computer-executable program code instructions further comprise program code instructions for:
in an instance in which the determination yields that the item will be delivered by the first carrier service, determining, via one or more processors, the delivery time and the delivery location by (1) calculating the impact of delivery to each location at the associated time considering, for each of one or more vehicles available to deliver the item, (iii) fuel consumption; (2) selecting a least impactful delivery location and delivery time.

14. The computer program product according to claim 13, wherein the computer-executable program code instructions further comprise program code instructions for:
in an instance in which the determination yields that the item will be delivered by the second carrier service, providing the consignee schedule information, via a network, to a second carrier system, the second carrier system associated with the second carrier service, the second carrier system configured to determine the delivery location and the delivery time based on the consignee schedule information; and
receiving, via the network, from the second carrier system, information indicative of the delivery location and the delivery time.

15. The computer program product according to claim 9, wherein the computer-executable program code instructions further comprise program code instructions for:
- storing communication preferences for providing information indicative of the delivery location and the delivery time, wherein the communication preferences (1) identify at least one communication format and at least one corresponding electronic destination address to be used in providing the information to a customer, and (2) define a time period prior to a first carrier attempt of the item in which a message providing the information is to be transmitted to the at least one corresponding electronic destination address;
- automatically generating the message providing the information regarding the item to be delivered to the customer; and
- automatically transmitting the message to the at least one corresponding electronic destination address within the defined time period prior to the first carrier attempt of the item to the customer.

16. The computer program product according to claim 15, wherein the at least one communication format is selected from the group consisting of a text message, an email message, a voice message, a picture message, a video message, and a social media message.

* * * * *